United States Patent
Yin et al.

(10) Patent No.: US 11,227,328 B2
(45) Date of Patent: Jan. 18, 2022

(54) INTERACTIVE METHOD AND DEVICE FOR E-COMMERCE APPLICATION PROGRAM

(71) Applicant: Beijing Xiaomi Mobile Software Co., Ltd., Beijing (CN)

(72) Inventors: Zhiyu Yin, Beijing (CN); Liming Zhang, Beijing (CN); Zhiguang Zheng, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 782 days.

(21) Appl. No.: 15/605,965

(22) Filed: May 26, 2017

(65) Prior Publication Data

US 2018/0144396 A1    May 24, 2018

(30) Foreign Application Priority Data

Nov. 24, 2016  (CN) .......................... 201611056135.5

(51) Int. Cl.
*G06Q 30/00*    (2012.01)
*G06Q 30/06*    (2012.01)
(Continued)

(52) U.S. Cl.
CPC ..... *G06Q 30/0643* (2013.01); *G06Q 30/0207* (2013.01); *G06Q 30/0278* (2013.01);
(Continued)

(58) Field of Classification Search
CPC .......... G06Q 30/0207; G06Q 30/0601; G06Q 50/01; G06Q 30/0278; G06Q 30/0643; H04L 51/04; H04L 51/24
(Continued)

(56) References Cited

U.S. PATENT DOCUMENTS

| 9,883,249 B2 * | 1/2018 | Taylor .................. H04N 21/252 |
| 2010/0094689 A1 * | 4/2010 | Fodor .................... G06Q 10/10 |
| | | 705/14.1 |

(Continued)

FOREIGN PATENT DOCUMENTS

| CN | 102523179 A | 6/2012 |
| CN | 104394420 A | 3/2015 |
| CN | 105809481 A | 7/2016 |

OTHER PUBLICATIONS

"Phoenix New Media Increases Strategic Investment in Personalized News Feed Application Yidian," PR Newswire [New York] Nov. 7, 2014, Dialog #1621092621 3pgs. (Year: 2014).*

(Continued)

*Primary Examiner* — Robert M Pond
(74) *Attorney, Agent, or Firm* — Jun He Law Offices P.C.; James J. Zhu

(57) ABSTRACT

An interactive method and device for an e-commerce application program are provided, which belong to the technical field of mobile terminal. The method includes: receiving an interactive virtual item sent from a seller account in an interactive channel of the e-commerce application program, wherein the interactive channel is a collection of groups configured to realize instant communications between the seller account and at least one user account, and the interactive channel corresponds to a product category in the e-commerce application program; determining the at least one user account in the interactive channel; and sending the interactive virtual item to the at least one user account in the interactive channel.

8 Claims, 16 Drawing Sheets

(51) Int. Cl.
  *H04L 12/58* (2006.01)
  *G06Q 50/00* (2012.01)
  *G06Q 30/02* (2012.01)

(52) U.S. Cl.
  CPC ......... *G06Q 30/0601* (2013.01); *G06Q 50/01* (2013.01); *H04L 51/04* (2013.01); *H04L 51/24* (2013.01)

(58) Field of Classification Search
  USPC .................................................. 705/26, 27
  See application file for complete search history.

(56) References Cited

U.S. PATENT DOCUMENTS

| | | | |
|---|---|---|---|
| 2010/0180296 A1* | 7/2010 | Hendricks | H04N 21/2543 725/34 |
| 2011/0209181 A1* | 8/2011 | Gupta | H04N 21/4345 725/62 |
| 2011/0321072 A1* | 12/2011 | Patterson | H04N 21/44222 725/5 |
| 2013/0019261 A1* | 1/2013 | Huber | G06Q 30/08 725/32 |
| 2013/0024267 A1* | 1/2013 | Libenson | G06Q 30/02 705/14.38 |
| 2014/0122200 A1* | 5/2014 | Granville | G06Q 30/0205 705/14.14 |
| 2015/0052553 A1 | 2/2015 | Carnahan et al. | |
| 2016/0034938 A1* | 2/2016 | Brown | G06Q 30/0277 705/14.16 |
| 2016/0247213 A1 | 8/2016 | Lee et al. | |
| 2016/0379263 A1* | 12/2016 | Uhalley | G06Q 30/0264 705/14.58 |
| 2016/0381427 A1* | 12/2016 | Taylor | H04N 21/23424 725/13 |
| 2018/0246975 A1* | 8/2018 | Zheng | G06F 16/9535 |

OTHER PUBLICATIONS

Extended European Search Report for European application No. 17160171.9, dated Apr. 10, 2017.
The first Office Action of Chinese Patent Application No. 201611056135.5, from the CNIPA, dated Mar. 19, 2020.

\* cited by examiner

INTERACTIVE METHOD AND DEVICE FOR E-COMMERCE APPLICATION PROGRAM

CROSS-REFERENCE TO RELATED APPLICATIONS

The present application is based upon and claims priority to Chinese Patent Application No. 201611056135.5, filed Nov. 24, 2016, the entire contents of which are incorporated herein by reference.

TECHNICAL FIELD

The present disclosure generally relates to the technical field of mobile terminals, and more particularly, to interactive methods and devices for an e-commerce application program.

BACKGROUND

An electronic commerce application program (APP) (also referred to as "e-commerce application program") refers to an application program for providing services to enable buying and selling of products by electronic transactions. Users can obtain introductions, price information and offers and the like relating to products using e-commerce application programs.

In an e-commerce application program, sellers may communicate with users via web pages. For example, a seller may provide a web page for showing offers, and the seller may provide another web page for issuing coupons. These web pages are arranged in a tree-like hierarchical structure in the e-commerce application, and users need to open the tree-like hierarchies one by one to find the web pages of interest. That is, it is difficult for users to find information of interest in the e-commerce application program, thereby resulting in a low interactive efficiency between users and sellers.

SUMMARY

Embodiments of the present disclosure provide an interactive method, device and system for an e-commerce application program.

According to a first aspect of embodiments of the present disclosure, there is provided an interactive method for an e-commerce application program, and the method includes: receiving an interactive virtual item sent from a seller account in an interactive channel of the e-commerce application program, wherein the interactive channel is a collection of groups configured to realize instant communications between the seller account and at least one user account, and the interactive channel corresponds to a product category in the e-commerce application program; determining the at least one user account in the interactive channel; and sending the interactive virtual item to the at least one user account in the interactive channel.

According to a second aspect of embodiments of the present disclosure, there is provided an interactive device for an e-commerce application program, and the device includes: a processor; and a memory for storing instructions executable by the processor; wherein the processor is configured to: receive an interactive virtual item sent from a seller account in an interactive channel of the e-commerce application program, wherein the interactive channel is a collection of groups configured to realize instant communications between the seller account and at least one user account, and the interactive channel corresponds to a product category in the e-commerce application program; determine the at least one user account in the interactive channel; and send the interactive virtual item to the at least one user account in the interactive channel.

According to a third aspect of embodiments of the present disclosure, there is provided an interactive device for an e-commerce application program, and the device includes: a processor; and a memory for storing instructions executable by the processor; wherein the processor is configured to: watch a product category in an e-commerce application program, wherein the product category corresponds to an interactive channel in the e-commerce application program, and the interactive channel is a collection of groups configured to realize instant communications between a seller account and at least one user account; and receive an interactive virtual item sent from the seller account in the interactive channel.

It is to be understood that both the foregoing general description and the following detailed description are exemplary only and are not restrictive of the present disclosure.

BRIEF DESCRIPTION OF THE DRAWINGS

The accompanying drawings, which are incorporated in and constitute a part of this specification, illustrate embodiments consistent with the present disclosure and, together with the description, serve to explain the principles of the present disclosure.

DETAILED DESCRIPTION

Implementations of the present disclosure will be described below in detail with reference to drawings.

Figure 1:
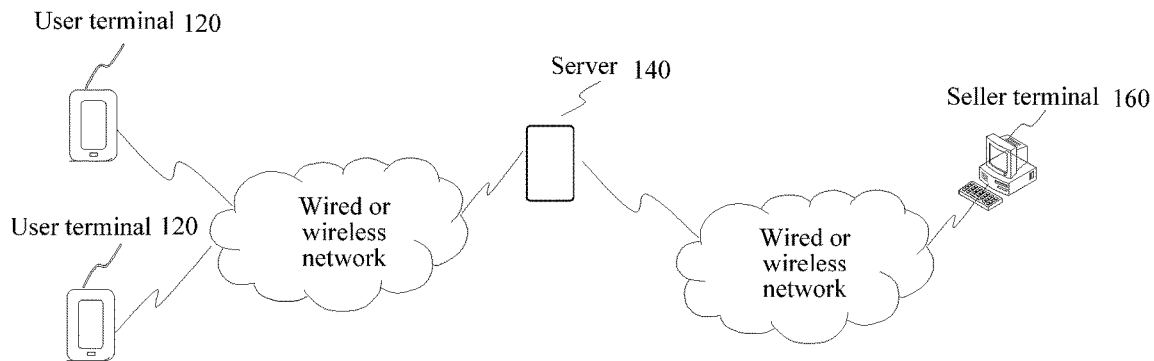
FIG. 1 is a block diagram showing an e-commerce system involved in embodiments of the present disclosure.

FIG. 1 is a block diagram showing an e-commerce system involved in embodiments of the present disclosure. The e-commerce system includes a user terminal 120, a server 140 and a seller terminal 160.

There is an e-commerce application program running in the user terminal 120. The e-commerce application program is an application program which provide services to enable buying and selling of products by electronic transactions, and can also be referred to as an e-commerce client, an e-mall client, and the like. An e-commerce application program usually provides at least one function such as product viewing, product purchase, online customer services, online after-sales services. When a user users an e-commerce application program, he or she logs into his or her own user account in the e-commerce application program. The user account is a unique identity of the user in the e-commerce application program. The user terminal 120 may be a terminal such as a mobile phone, a tablet, an electronic reader, a Moving Picture Experts Group Audio Layer III player (MP3 player), a Moving Picture Experts Group Audio Layer IV player (MP4 player), a laptop, and the like.

The user terminal 120 is connected with the server 140 via a wired or wireless network.

The server 140 is a background server of the e-commerce application program. The server 140 may be a single server, a server cluster formed by a plurality of servers or a cloud computation center. The server 140 has backend functions relating to e-commerce, for example, product information inquiry, product ordering, order management, delivery management and the like. In addition to the these functions, the server 140 also has social communication capabilities, for example, a communication capability for providing interactive channels classified according to product categories, a communication capability for providing chat channels to enable multi-user chatting, a communication capability for enabling anchor users to conduct live video streaming.

The server 140 is also connected with the seller terminal 160 via a wired or wireless network.

There is a seller version of the e-commerce application program running in the seller terminal 160. The seller version of the e-commerce application program may be an application client or a web client. The seller version of the e-commerce application program has a function of configuring and managing the whole or a part of modules in the server 140. Optionally, when a seller uses the e-commerce application program, the seller logs into its seller account in the e-commerce application program. The seller account is configured to identify the identity of the seller. In some e-commerce systems, one seller has only one seller account. In some other e-commerce systems, one seller may have a plurality of seller accounts.

Optionally, the wired or wireless network employs a standard communication technology and/or protocol. The network may usually be Internet, and may also be any other networks, including but not limited to a Local Area Network (LAN), a Metropolitan Area Network (MAN), a Wide Area Network (WAN), a mobile, wired or wireless network, a private network, or a virtual private network, or any combination thereof. In some embodiments, technologies and/or formats including Hyper Text Mark-up Language (HTML), Extensible Markup Language (XML) and the like are used to represent data exchanged over networks. In addition, common encryption technologies, for example, Secure Socket Layer (SSL), Transport Layer Security (TLS), Virtual Private Network (VPN), Internet Protocol Security (IPsec) and the like, can be used to encrypt all or a part of links. In some other embodiments, customized and/or proprietary data communication technologies can be used to replace or supplement the above data communication technologies.

Figure 2:
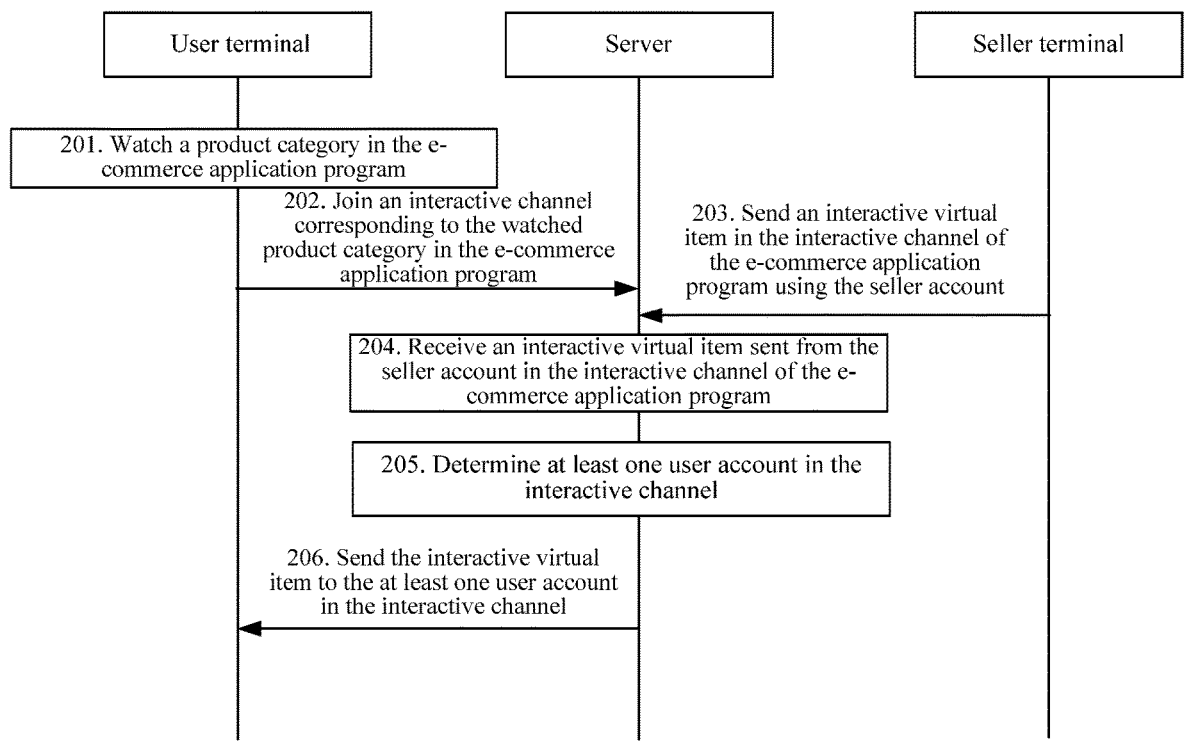
FIG. 2 is a flowchart showing an interactive method for an e-commerce application program according to an exemplary embodiment of the present disclosure.

FIG. 2 is a flowchart showing an interactive method for an e-commerce application program according to an exemplary embodiment of the present disclosure. In the embodiment, for example, the interactive method for an e-commerce application program is applied in the e-commerce system as shown in FIG. 1. The method includes the following steps.

In step 201, the user terminal watches a product category in the e-commerce application program.

The user terminal may watch a product category of interest in the e-commerce application program. Product categories are generated according to at least one dimension, for example, fields which products belong to, product functions, product names, product identification.

In step 202, the user terminal joins an interactive channel corresponding to the watched product category in the e-commerce application program.

The e-commerce application provides interactive channels. Each interactive channel is a collection of groups configured to realize instant communications between a seller account and at least one user account. Optionally, each product category corresponds to an interactive channel in the e-commerce application program. Users in the same interactive channel can send at least one of real time text messages, picture messages, voice messages, video messages, image-text messages, link messages, and geographic location messages to each other to conduct communications. Generally, the interactive channels are established in the e-commerce application program by seller terminals using the seller accounts, and seller accounts have an administrative authority over the interactive channels.

Optionally, after the user terminal watches a certain product category, the user account logged into by the user terminal is automatically added by the server into an interactive channel corresponding to the product category.

In step 203, the seller terminal sends an interactive virtual item in the interactive channel of the e-commerce application program using the seller account.

In the interactive channel, the seller terminal may send interactive virtual items to user accounts using the seller account. Optionally, the interactive virtual items may include at least one of coupons, virtual gold coins, virtual props, virtual presents, virtual pets, electronic vouchers for exchanging actual items, purchase qualifications for purchasing actual items, experience vouchers for experiencing actual items, usage vouchers for using actual items.

The embodiment does not impose specific limitations on the types of the interactive virtual items.

In step 204, the server receives an interactive virtual item sent from the seller account in the interactive channel of an e-commerce application program.

In step 205, the server determines at least one user account in the interactive channel.

Generally, each interactive channel corresponds to one product category, there usually exist a plurality of user accounts in each interactive channel, and each of the user accounts is a user account which watches the product category.

The server needs to determine the user accounts which belong to the interactive channel.

In step 206, the server sends the interactive virtual item to the at least one user account in the interactive channel.

Correspondingly, the user terminal receives the interactive virtual item sent from the seller account in the interactive channel.

In view of the above, in the present embodiment, by adding into an e-commerce application program an interactive channel which supports instant communications and sending by a seller account an interactive virtual item to a user account which is interested in a product category via the interactive channel, instant interactions between seller accounts and user accounts can be realized. Also, a user account can collectively and efficiently obtain information relating to a product category of interest, thereby enriching the communication types between users and sellers and improving communication efficiency.

The interactive virtual items in the embodiment shown in FIG. 2 can be of different types and can be sent in different manners, and the technical solutions of the present disclosure will be described with the following embodiments.

Figure 3A:
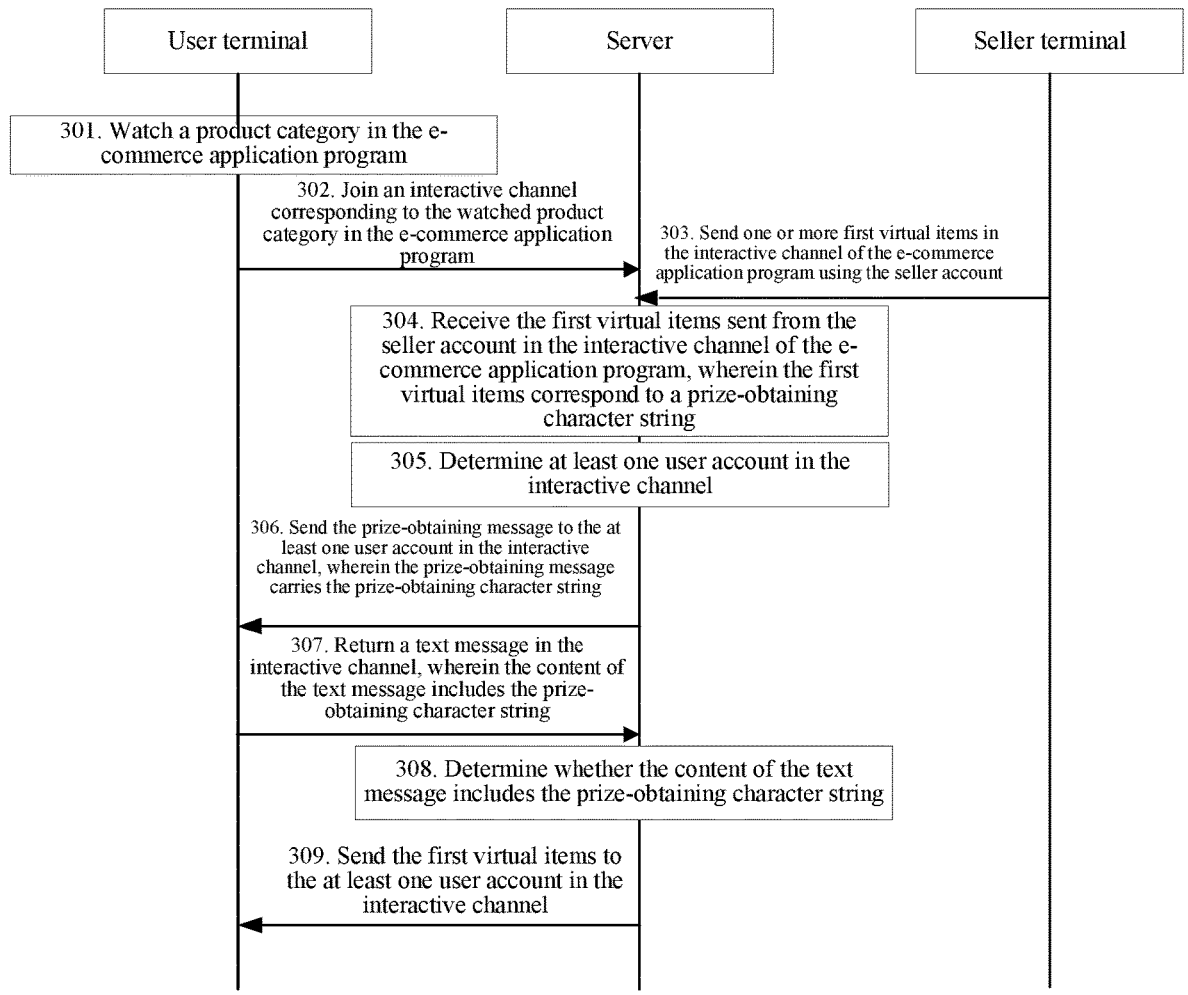
FIG. 3A is a flowchart showing an interactive method for an e-commerce application program according to another exemplary embodiment of the present disclosure.

FIG. 3A is a flowchart showing an interactive method for an e-commerce application program according to another exemplary embodiment of the present disclosure. In the embodiment, for example, the interactive method for an e-commerce application program is applied in the e-commerce system as shown in FIG. 1. The method includes the following steps.

In step 301, the user terminal watches a product category in the e-commerce application program.

The user terminal may watch a product category of interest in the e-commerce application program. Product categories are generated according to at least one dimension, for example, fields which products belong to, product functions, product names, product identification.

In step 302, the user terminal joins an interactive channel corresponding to the watched product category in the e-commerce application program.

The e-commerce application program provides interactive channels. Each interactive channel is a collection of groups configured to realize instant communications between a seller account and at least one user account. Optionally, each product category corresponds to an interactive channel in the e-commerce application program. Users in the same interactive channel can send at least one of real time text messages, picture messages, voice messages, video messages, image-text messages, link messages, and geographic location messages to each other to conduct communications. Generally, the interactive channels are established in the e-commerce application program by seller terminals using the seller accounts, and seller accounts have an administrative authority over the interactive channels.

Optionally, after the user terminal watches a certain product category, the user account logged into by the user terminal is automatically added by the server into an interactive channel corresponding to the product category.

For example, if the user terminal watches a product category: "XX mobile phone", the user account corresponding to the user terminal is automatically added into the interactive channel corresponding to the product category: "XX mobile phone".

In step 303, the seller terminal sends one or more first virtual items in the interactive channel of the e-commerce application program using the seller account.

In the interactive channel, the seller terminal may send interactive virtual items to user accounts using the seller account. Optionally, the interactive virtual items may include at least one of coupons, virtual gold coins, virtual props, virtual presents, virtual pets, electronic vouchers for exchanging actual items, purchase qualifications for purchasing actual items, experience vouchers for experiencing actual items, usage vouchers for using actual items.

In the embodiment, the interactive virtual item includes one or more first virtual items. The first virtual items are items which can be obtained using a prize-obtaining character string.

The seller terminal sends in the interaction channel the first virtual items and the prize-obtaining character string corresponding to the first virtual items to the server. Optionally, there may be a plurality of first virtual items, and the plurality of first virtual items may be the same or not.

Optionally, the seller terminal may also send the categories and/or number of the first virtual items to the server.

Figure 3B:
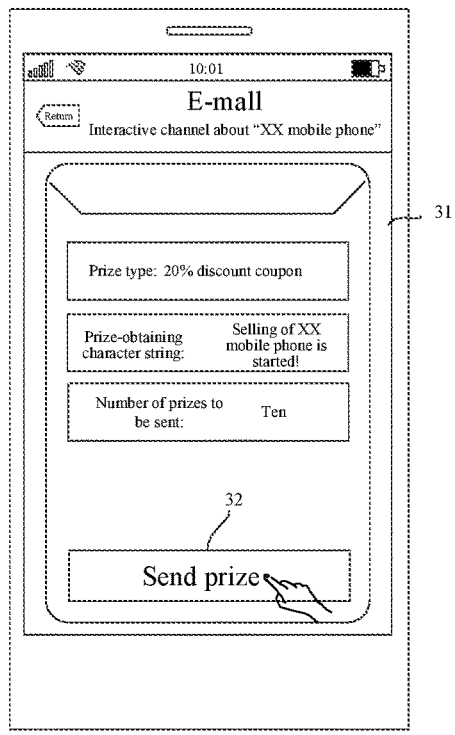
FIG. 3B is a schematic diagram showing a prize-setting interface according to another exemplary embodiment of the present disclosure.

Referring to FIG. 3B, on an interface 31 of an interactive channel of an e-commerce application program, a seller inputs the type of the first virtual item: "20% discount", the prize-obtaining character string: "Selling of XX mobile phone is started!", the number of the first virtual items:

"ten", and then the seller may click a button control 32 which is shown as "Send prize". By doing so, the first virtual items can be sent in the interactive channel.

In step 304, the server receives the first virtual items sent from the seller account in the interactive channel of the e-commerce application program. The first virtual items correspond to a prize-obtaining character string.

Optionally, the server also receives the prize-obtaining character string corresponding to the first virtual items to generate a prize-obtaining message carrying the prize-obtaining character string.

In step 305, the server determines at least one user account in the interactive channel.

Generally, each interactive channel corresponds to one product category, there usually exist a plurality of user accounts in each interactive channel, and each of the user accounts is a user account which watches the product category.

The server needs to determine the user accounts which belong to the interactive channel.

In step 306, the server sends the prize-obtaining message to the at least one user account in the interactive channel. The prize-obtaining message carries the prize-obtaining character string.

Correspondingly, the user terminal receives the prize-obtaining message sent from the seller account in the interactive channel, and displays the prize-obtaining message. The prize-obtaining message carries the prize-obtaining character string.

Figure 3C:
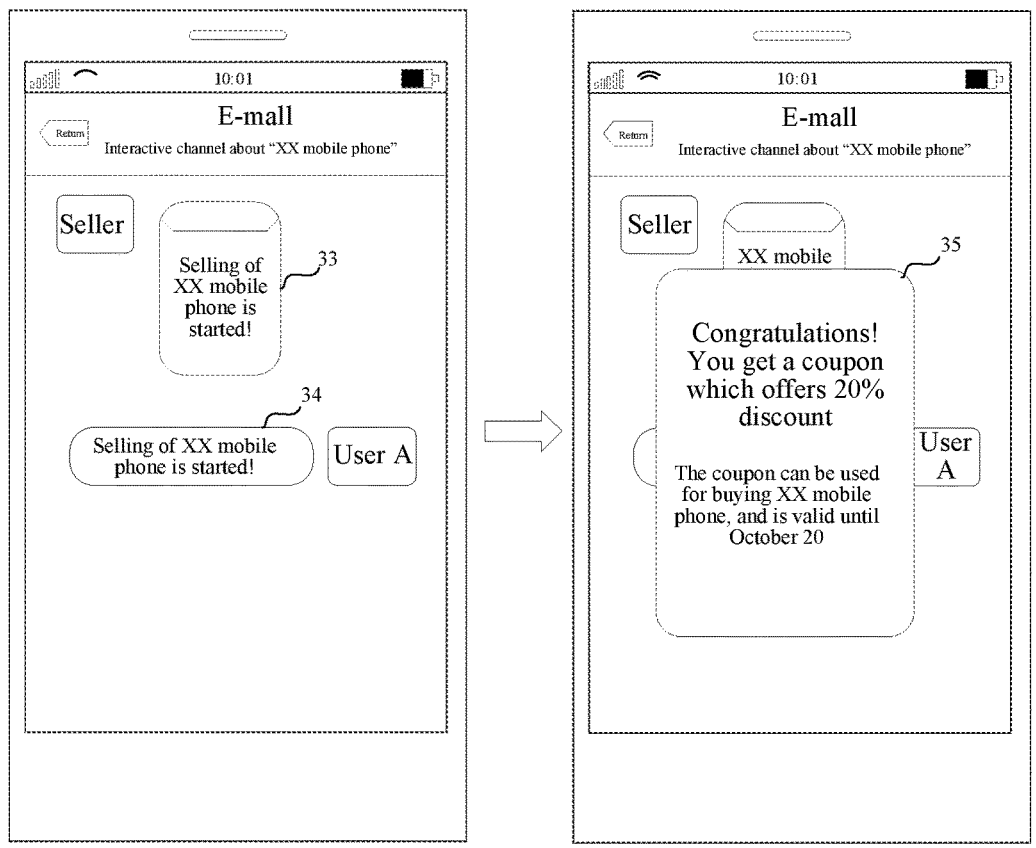
FIG. 3C is a schematic diagram showing an interface of an interactive channel according to another exemplary embodiment of the present disclosure.

Referring to FIG. 3C, the user terminal displays a prize-obtaining message 33 on the interface 31 of the interactive channel. The prize-obtaining message 33 carries a prize-obtaining character string: "Selling of XX mobile phone is started!"

In step 307, the user terminal returns a text message in the interactive channel. The content of the text message includes the prize-obtaining character string.

The user terminal may send a text message back in the interactive channel using the user account, and the content of the text message is the prize-obtaining character string.

Referring to FIG. 3C again, after a user sees the prize-obtaining message 33, if he or she wants to obtain the prize, he or she can input in the interactive channel a text message 34: "Selling of XX mobile phone is started!", and the content of the text message 34 includes the prize-obtaining character string, or the content of the text message 34 is substantially equal to the prize-obtaining character string.

Correspondingly, the server receives the text message returned back from the user account.

In step 308, the server determines whether the content of the text message includes the prize-obtaining character string.

The server may receive text messages sent from a plurality of user terminals in the interactive channels.

For the text messages the contents of which include the prize-obtaining character string, step 308 is performed.

For the text messages the contents of which do not include the prize-obtaining character string, the text messages are ignored.

In step 309, the server sends the first virtual items to the at least one user account in the interactive channel.

The server may send the first virtual items to at least one user account which sends the text message.

Correspondingly, the at least one user terminal receives the first virtual items sent from the seller account.

Referring to FIG. 3C again, a popup box 35 is displayed on the interface of the interactive channel of the user terminal, and the text content of the popup box 35 includes: "Congratulations! You get a coupon which offers 20% discount", which indicates that the user account A of the user terminal successfully obtains the first virtual item.

Optionally, the seller terminal may also send information corresponding to the product category to user accounts in the interactive channel using the seller account. The information may include news, price information, performance introduction, user comments which are related to the product category, and so on. The information can be in the form of at least one of a text message, an image-text message, a webpage message, a voice message, a video message. After receiving the information corresponding to the product category which is sent from the seller account to the user accounts in the interactive channel, the server determines the user accounts in the interactive channel and sends the information to the user accounts in the interactive channel.

In view of the above, in the present embodiment, a seller account sends a first virtual item to at least one user account via an interactive channel, and a user account inputs a corresponding prize-obtaining string to obtain the first virtual item. This realizes real time two-way interactions between the seller account and the at least one user account, thereby enhancing the social attributes of e-commerce application programs. In this way, user accounts are actively involved in the interaction procedure, and thus the communication types between users and sellers are enriched.

Figure 4A:
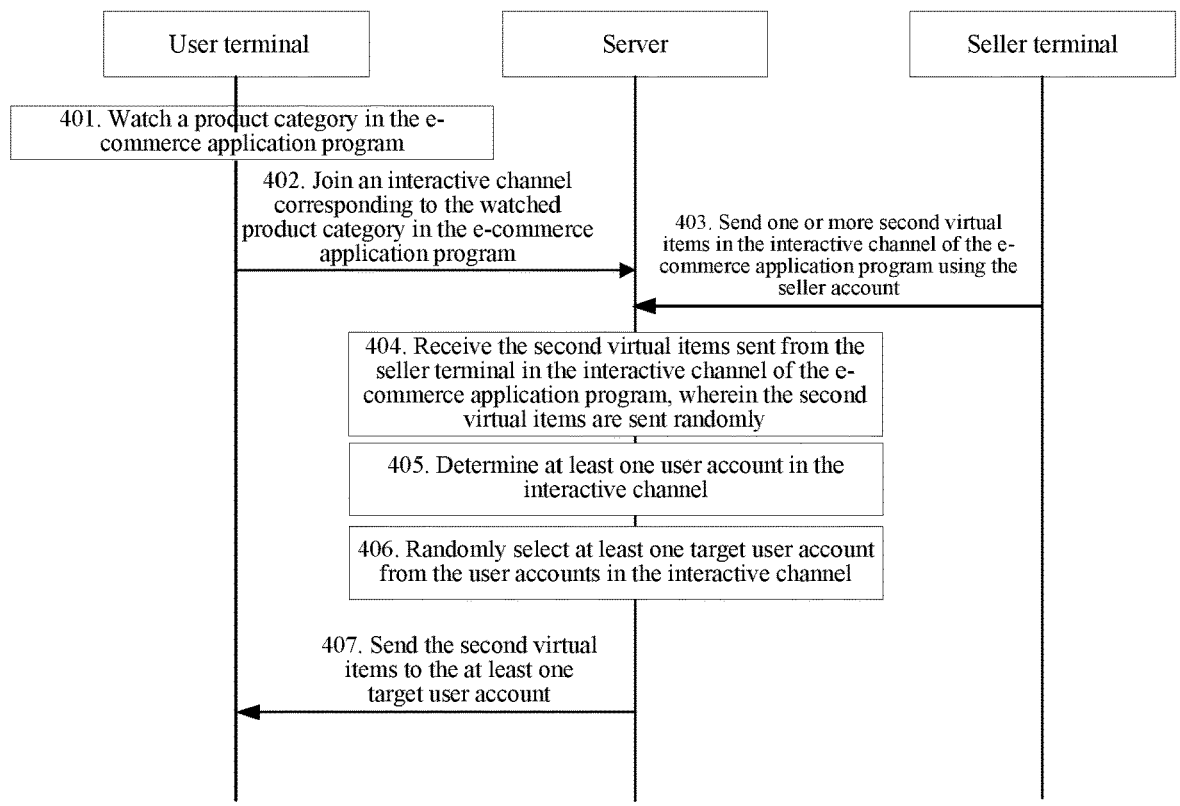
FIG. 4A is a flowchart showing an interactive method for an e-commerce application program according to another exemplary embodiment of the present disclosure.

FIG. 4A is a flowchart showing an interactive method for an e-commerce application program according to another exemplary embodiment of the present disclosure. In the embodiment, for example, the interactive method for an e-commerce application program is applied in the e-commerce system as shown in FIG. 1. The method includes the following steps.

In step 401, the user terminal watches a product category in the e-commerce application program.

The user terminal may watch a product category of interest in the e-commerce application program. Product categories are generated according to at least one dimension, for example, fields which products belong to, product functions, product names, product identification.

In step 402, the user terminal joins an interactive channel corresponding to the watched product category in the e-commerce application program.

The e-commerce application program provides interactive channels. Each interactive channel is a collection of groups configured to realize instant communications between a seller account and at least one user account. Optionally, each product category corresponds to an interactive channel in the e-commerce application program. Users in the same interactive channel can send at least one of real time text messages, picture messages, voice messages, video messages, image-text messages, link messages, and geographic location messages to each other to conduct communications. Generally, the interactive channels are established in the e-commerce application program by seller terminals using the seller accounts, and seller accounts have an administrative authority over the interactive channels.

Optionally, after the user terminal watches a certain product category, the user account logged into by the user terminal is automatically added by the server into an interactive channel corresponding to the product category.

For example, if the user terminal watches a product category: "XX mobile phone", the user account corresponding to the user terminal is automatically added into the interactive channel corresponding to the product category: "XX mobile phone".

In step 403, the seller terminal sends one or more second virtual items in the interactive channel of the e-commerce application program using the seller account.

In the interactive channel, the seller terminal may send interactive virtual items to user accounts using the seller account. Optionally, the interactive virtual items may include at least one of coupons, virtual gold coins, virtual props, virtual presents, virtual pets, electronic vouchers for exchanging actual items, purchase qualifications for purchasing actual items, experience vouchers for experiencing actual items, usage vouchers for using actual items.

In the embodiment, the interactive virtual item includes one or more second virtual items. The second virtual items are items which can be sent randomly. In other words, the second virtual items have a random attribute.

The seller terminal sends in the interaction channel the second virtual items to the server. Optionally, there may be a plurality of second virtual items, and the plurality of second virtual items may be the same or not.

Optionally, the seller terminal may also send the categories and/or number of the second virtual items to the server.

Figure 4B:
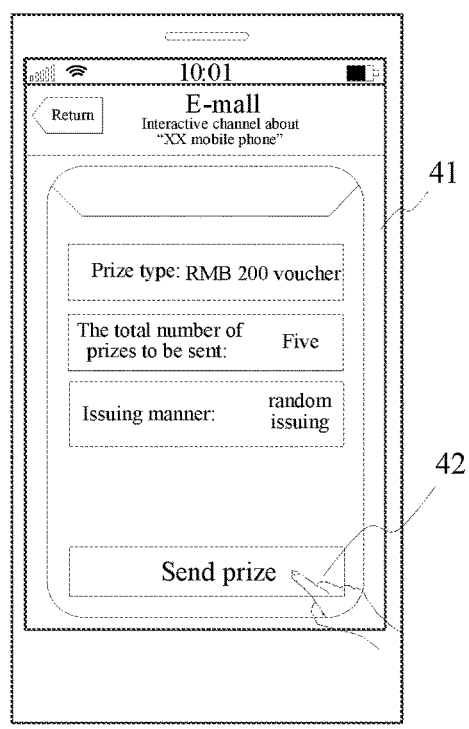
FIG. 4B is a schematic diagram showing a prize-setting interface according to another exemplary embodiment of the present disclosure.

Referring to FIG. 4B, on an interface 41 of an interactive channel of an e-commerce application program, a seller inputs the type of the second virtual items: "RMB 200 voucher", the number of the second virtual items: "five", the issuing manner of the second virtual items: "random issuing", then the seller may click a button control 42 which is shown as "Send prize". By doing so, the second virtual items can be sent in the interactive channel.

In step 404, the server receives the second virtual items sent from the seller terminal in the interactive channel of the e-commerce application program. The second virtual items are sent randomly.

Optionally, the server also receives the categories and/or number of the second virtual items sent from the seller terminal.

In step 405, the server determines at least one user account in the interactive channel.

Generally, each interactive channel corresponds to one product category, there usually exist a plurality of user accounts in each interactive channel, and each of the user accounts is a user account which watches the product category.

The server needs to determine which user accounts belong to the interactive channel. Optionally, the server also determines the attribution information of each user account in the interactive channel, including at least one of online or not, online time, speaking frequency, the level in the interactive channel, the time of the most recent speaking, and the like.

In step 406, the server randomly selects at least one target user account from the user accounts in the interactive channel.

Optionally, the server may select the at least one target user account in any one of the following manners.

In a first manner, the server randomly selects at least one target user account from all of the user accounts in the interactive channel.

In a second manner, the server randomly selects at least one target user account from online user accounts in the interactive channel.

In a third manner, the server randomly selects at least one target user account from n user accounts in the interactive channel whose online time is the longest.

In a fourth manner, the server randomly selects at least one target user account from n user accounts in the interactive channel whose speaking frequency is the highest.

In a fifth manner, the server randomly selects at least one target user account from n user accounts in the interactive channel whose level is higher than a preset level.

In a six manner, the server randomly selects at least one target user account from n user accounts in the interactive channel who speak recently.

Optionally, there may be one or more target user accounts. The number of the target user accounts is smaller than or equal to the number of the second virtual items.

In step 407, the server sends the second virtual items to the at least one target user account.

After the at least one target user account is randomly selected, the server can send the second virtual items to the at least one user account.

Correspondingly, the at least one target user account receives the second virtual items sent from the seller account.

Optionally, the seller terminal may also send information corresponding to the product category to user accounts in the interactive channel using the seller account. The information may include news, price information, performance introduction, user comments which are related to the product category, and so on. The information can be in the form of at least one of a text message, an image-text message, a webpage message, a voice message, a video message. After receiving the information corresponding to the product category which is sent from the seller account to the user accounts in the interactive channel, the server determines the user accounts in the interactive channel and sends the information to the user accounts in the interactive channel.

In view of the above, in the present embodiment, second virtual items are sent from a seller account to at least one user account via an interactive channel, and a server randomly sends the second virtual items to target user accounts. Thus, real time interactions between seller accounts and user accounts are realized, the logging frequency of the user accounts and the usage frequency of the e-commerce application program are increased, thereby enhancing the social attributes of e-commerce application programs, and enriching communication types between users and sellers.

Figure 5:
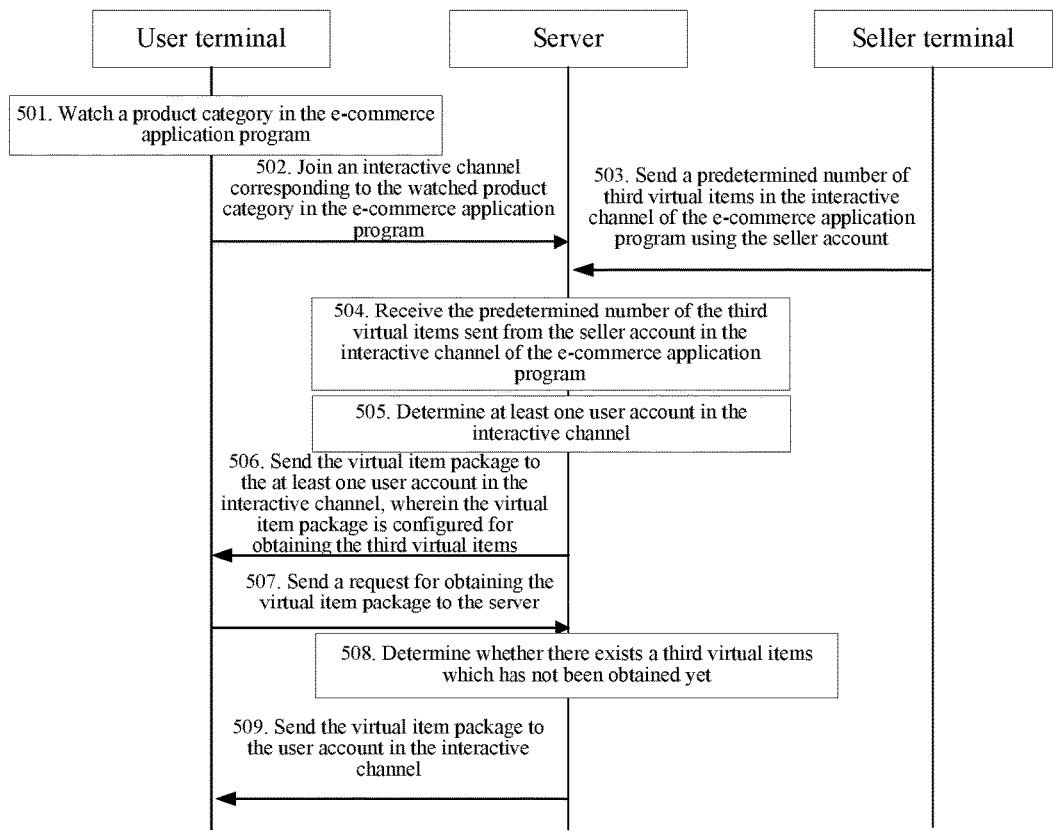
FIG. 5 is a flowchart showing an interactive method for an e-commerce application program according to another exemplary embodiment of the present disclosure.

FIG. 5 is a flowchart showing an interactive method for an e-commerce application program according to another exemplary embodiment of the present disclosure. In the embodiment, for example, the interactive method for an e-commerce application program is applied in the e-commerce system as shown in FIG. 1. The method includes the following steps.

In step 501, the user terminal watches a product category in the e-commerce application program.

The user terminal may watch a product category of interest in the e-commerce application program. Product categories are generated according to at least one dimension, for example, fields which products belong to, product functions, product names, product identification.

In step 502, the user terminal joins an interactive channel corresponding to the watched product category in the e-commerce application program.

The e-commerce application provides interactive channels. Each interactive channel is a collection of groups configured to realize instant communications between a seller account and at least one user account. Optionally, each category corresponds to an interactive channel in the e-commerce application program. Users in the same interactive channel can send at least one of real time text messages, picture messages, voice messages, video messages, image-text messages, link messages, and geographic location messages to each other to conduct communications. Generally, the interactive channels are established in the e-commerce application program by seller terminals using the seller accounts, and seller accounts have an administrative authority over the interactive channels.

Optionally, after the user terminal watches a certain product category, the user account logged into by the user terminal is automatically added by the server into an interactive channel corresponding to the product category.

For example, if the user terminal watches a product category: "XX mobile phone", the user account corresponding to the user terminal is automatically added into the interactive channel corresponding to the product category: "XX mobile phone".

In step 503, the seller terminal sends a predetermined number of the third virtual items in the interactive channel of the e-commerce application program using the seller account.

In the interactive channel, the seller terminal may send interactive virtual items to user accounts using the seller account. Optionally, the interactive virtual items may include at least one of coupons, virtual gold coins, virtual props, virtual presents, virtual pets, electronic vouchers for exchanging actual items, purchase qualifications for purchasing actual items, experience vouchers for experiencing actual items, usage vouchers for using actual items.

In the embodiment, the interactive virtual item includes one or more third virtual items. The number of the third virtual items is predetermined, and the third virtual items are items which are sequentially distributed from the early to the late in the order of requesting the third virtual items.

The seller terminal sends in the interaction channel the predetermined number of the third virtual items to the server. Optionally, there may be a plurality of third virtual items, and the plurality of third virtual items may be the same or not.

In step 504, the server receives the predetermined number of the third virtual items sent from the seller account in the interactive channel of the e-commerce application program.

Optionally, the server may generate a virtual item package according to the predetermined number of the third virtual items. The virtual item package is configured for obtaining the third virtual items.

In step 505, the server determines at least one user account in the interactive channel.

Generally, each interactive channel corresponds to one product category, there usually exist a plurality of user accounts in each interactive channel, and each of the user accounts is a user account which watches the product category.

The server needs to determine which user accounts belong to the interactive channel.

In step 506, the server sends the virtual item package to the at least one user account in the interactive channel. The virtual item package is configured for obtaining the third virtual items.

Correspondingly, the user terminal receives the virtual item package sent from the seller account in the interactive channel.

In step 507, the user terminal sends a request for obtaining the virtual item package to the server.

After receiving the virtual item package, the user terminal displays the virtual item package on a chat interface of the interactive channel. Optionally, the virtual item package corresponds to a receiving link in which there exists information for identifying the third virtual items.

When the virtual item package is clicked or tapped by a user, the user terminal sends a request for obtaining the virtual item package to the server according to the receiving link. The request carries identification information of the third virtual items.

Correspondingly, the server receives the request sent from at least one user account.

The server receives the request sent from at least one user account and obtains the identification information of the third virtual items from the request.

There may be a plurality of user accounts in the interactive channel, and thus the server may receive requests sent from different user accounts at different sending times.

In step 508, the server determines whether there exists a third virtual item which has not been obtained yet.

The server determines whether there exists the third virtual item which has not been obtained yet according to the identification information of the third virtual items.

If there exists the third virtual item which has not been obtained yet, step 509 is performed.

If there is no third virtual item which has not been obtained yet, i.e., all of the third virtual items have been obtained, the server sends failure information to the user terminal to indicate the failure of the obtaining of the third virtual item.

In step 509, if there exists the third virtual item which has not been obtained yet, the server sends the third virtual item to the requesting user account.

After the sever sends the third virtual items to at least one user account, the server identifies the third virtual items as an "obtained" state which indicates that the third virtual items have been obtained by the at least one user account.

Optionally, the seller terminal may also send information corresponding to the product category to user accounts in the interactive channel using the seller account. The information may include news, price information, performance introduction, user comments which are related to the product category, and so on. The information can be in the form of at least one of a text message, an image-text message, a webpage message, a voice message, a video message. After receiving the information corresponding to the product category which is sent from the seller account to the user accounts in the interactive channel, the server determines the user accounts in the interactive channel and sends the information to the user accounts in the interactive channel.

In view of the above, in the present embodiment, third virtual items are sent to at least one user account from a seller account via an interactive channel, a request for obtaining the third virtual item may be sent manually using a user account, and then the third virtual items can be obtained at different times. That is, those user accounts which send the request earlier can obtain the third virtual items. This realizes real time two-way interactions between the seller account and the at least one user account, thereby enhancing the social attributes of e-commerce application programs. In this way, user accounts are actively involved in the interaction procedure, and thus the communication types between users and sellers are enriched.

In addition to interactions between sellers and users via interactive channels of e-commerce application programs, embodiments of the present disclosure may also realize interactions between users via group channels.

Figure 6:
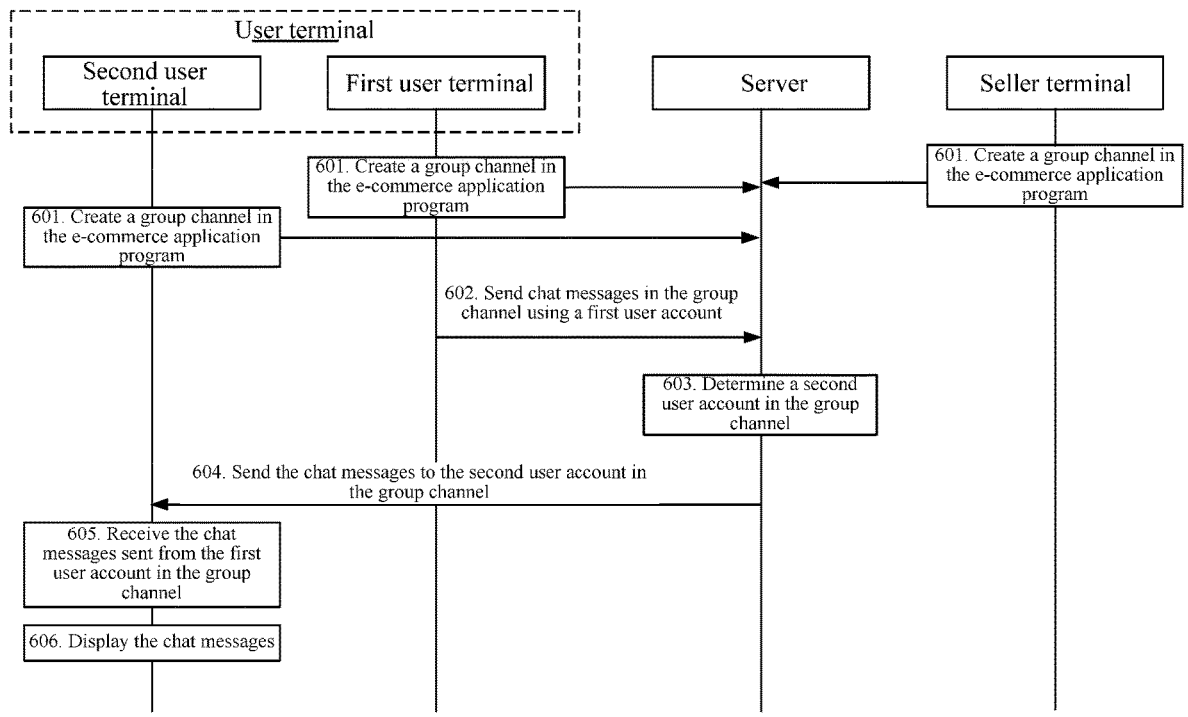
FIG. 6 is a flowchart showing an interactive method for an e-commerce application program according to another exemplary embodiment of the present disclosure.

FIG. 6 is a flowchart showing an interactive method for an e-commerce application program according to another exemplary embodiment of the present disclosure. In the embodiment, for example, the interactive method for an e-commerce application program is applied in the e-commerce system as shown in FIG. 1. The present embodiment can be combined with any one of the interactive methods for an e-commerce application program as shown in FIGS. 2 to 5. The method includes the following steps.

In step 601, the seller terminal and/or the user terminal create a group channel in the e-commerce application program.

In the embodiment, the e-commerce application also provides group channels. Each group channel is a collection of groups configured to realize instant communications between at least two user accounts. User accounts which belong to the same group channel can send at least one of real time text messages, picture messages, voice messages, video messages, image-text messages, link messages, and geographic location messages to each other to conduct communications.

Optionally, each group channel corresponds to a product category, or a subject, or a hobby or interest.

Optionally, the seller terminal creates one or more group channels in the e-commerce application program using a seller account, or the user terminal creates one or more group channels in the e-commerce application programs using a user account. The creator of a group channel has an administrative authority over the created group channel.

Optionally, user accounts can select to join a group channel on their own initiative so as to communicate with other user accounts.

In step 602, a first user terminal sends chat messages in the group channel using a first user account.

Correspondingly, the server receives the chat messages sent from the first user terminal using the first user account in the group channel.

In step 603, the server determines a second user account in the group channel.

Optionally, there may be a plurality of user accounts in the group channel, and the second user account is a user account other than the first user account.

In step 604, the server sends the chat messages to the second user account in the group channel.

In step 605, a second user terminal receives the chat messages sent from the first user account in the group channel.

In step 606, the second user terminal displays the chat messages.

Similarly, when the second user terminal sends chat messages in the group channel using the second user account, the server forwards the chat messages to the first user account and/or other second user accounts.

There usually exist comment systems in e-commerce application programs, each user account communicates with other user accounts via the comment systems asynchronously and not in real time. However, in the present embodiment, by providing a group channel in an e-commerce application program, individual user accounts in the e-commerce application accounts can communicate with each other in real time. Thus, as compared with conventional comment systems in e-commerce application programs, the present embodiment increases the social attribute of the e-commerce application program, and enriches the communication types between user accounts in the e-commerce application program.

An embodiment of the present disclosure also provides a live channel in an e-commerce application program. The live channel is configured to realize live and text communications between at least two user accounts.

Figure 7:
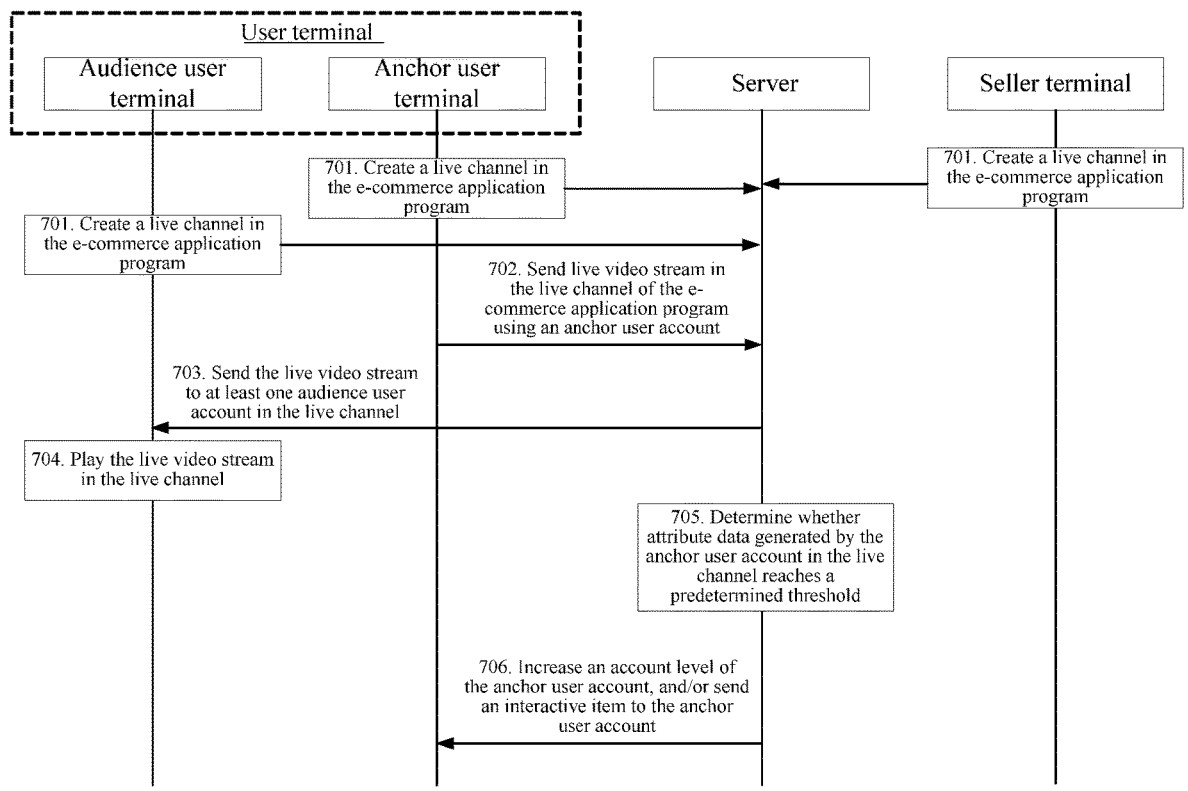
FIG. 7 is a flowchart showing an interactive method for an e-commerce application program according to another exemplary embodiment of the present disclosure.

FIG. 7 is a flowchart showing an interactive method for an e-commerce application program according to another exemplary embodiment of the present disclosure. In the embodiment, for example, the interactive method for an e-commerce application program is applied in the e-commerce system as shown in FIG. 1. The present embodiment can be combined with any one of the interactive methods for an e-commerce application program as shown in FIGS. 2 to 6. The method includes the following steps.

In step 701, the seller terminal and/or the user terminal create a live channel in the e-commerce application program.

In the present embodiment, the e-commerce application program also provides live channels. Each live channel is a collection of groups configured to realize instant communications between at least two user accounts. User accounts which belong to the same live channel can send at least one of real time text messages, picture messages, voice messages, video messages, image-text messages, link messages, and geographic location messages to each other to conduct communications.

Optionally, each live channel corresponds to a product category, or a subject, or a hobby or interest, or an anchor.

Optionally, the seller terminal creates one or more live channels in the e-commerce application program using a seller account, or the user terminal creates one or more live channels in the e-commerce application program using a user account. The creator of a live channel has an administrative authority over the created group channel.

Optionally, user accounts can select to join a live channel on their own initiative so as to communicate with other user accounts.

In step 702, an anchor user terminal sends live video stream in the live channel of the e-commerce application program using an anchor user account.

The anchor user terminal may be one of a plurality of user terminals. The anchor user account has a live-broadcasting authority in the live channel of the e-commerce application program.

Optionally, the live video stream is configured for delivering live video contents relating to a predetermined product. For example, the live video stream is configured to test a new mobile phone, introduce performance of the mobile phone, exhibiting functions of the mobile phone, and so on.

Correspondingly, the server receives the live video stream sent from the anchor user account in the live channel of the e-commerce application program.

In step 703, the server sends the live video stream to at least one audience user account in the live channel.

Optionally, the server determines other user accounts in the live channel than the anchor user account as the audience user accounts.

The server sends the live video stream to at least one audience user account in a broadcast or multicast mode.

Correspondingly, the at least one audience user terminal receives, using the audience user accounts, the live video stream forwarded by the server.

In step 704, the at least one audience user terminal plays the live video stream in the live channel.

In step 705, the server determines whether attribute data generated by the anchor user account in the live channel reaches a predetermined threshold.

If the attribute data generated by the anchor user account in the live channel reaches the predetermined threshold, step 706 is performed. If the attribute data generated by the anchor user account in the live channel does not reach a predetermined threshold, no process is performed temporarily.

Optionally, the attribute data includes the number of people who follow the live channel, and/or the number of simultaneous online people.

If the attribute data includes the number of people who follow the live channel, the server determines whether the number of people who follow the live channel reaches a first threshold.

Optionally, the server calculates the number of people who follow the live channel. The number of people who follow the live channel refers to the number of audience user accounts which follow the live channel, or refers to the number of the audience user accounts which follows the anchor user account.

Optionally, the first threshold can be set in the server by the seller terminal using the seller account.

If the number of the people who follow the live channel reaches the first threshold, step 706 is performed. If the number of the people who follow the live channel does not reach the first threshold, no process is performed temporarily.

If the attribute data includes the number of simultaneous online people, the server determines whether the number of simultaneous online people in the live channel reaches a second threshold.

Optionally, the server calculates the number of simultaneous online people in the live channel. The number of simultaneous online people refers to the number of audience user accounts which are watching the live video stream at the same time.

Optionally, the second threshold can be set in the server by the seller terminal using the seller account.

If the number of simultaneous online people in the live channel reaches the second threshold, step 706 is performed. If the number of simultaneous online people in the live channel does not reach the second threshold, no process is performed temporarily.

In step 706, the server increases an account level of the anchor user account, and/or sends an interactive item to the anchor user account.

If the number of people who follow the live channel reaches the first threshold or the number of simultaneous online people reaches the second threshold, the server increases the account level of the anchor user account. Usually, different account levels have different authority levels. For example, a first account level has an authority of creating a live channel with an upper limit of 100 people and obtaining 5 coupons per month; a second account level has an authority of creating a live channel with an upper limit of 500 people and obtaining 50 coupons per month; and a third account level has an authority of creating a live channel with an upper limit of 1000 people and obtaining 100 coupons per month.

Optionally, the increased account level is in positive correlation to the attribute data. If the attribute data is the number of people who follow the live channel, the more the number of people who follow the live channel goes beyond the first threshold, the more the account level increased by the server will be. If the attribute information is the number of simultaneous online people, the more the number of simultaneous online people goes beyond the second threshold, the more the account level increased by the server will be.

If the number of people who follow the live channel reaches the first threshold or the number of simultaneous online people reaches the second threshold, the server may also send an interactive virtual item to the anchor user account. The interactive virtual item can be preset in the server by the seller terminal using the seller account.

Optionally, the value of the sent interactive virtual item is in positive correlation to the attribute date. If the attribute data is the number of people who follow the live channel, the more the number of people who follow the live channel goes beyond the first threshold, the higher the value of the interactive virtual item sent by the server will be. If the attribute information is the number of simultaneous online people, the more the number of simultaneous online people goes beyond the second threshold, the higher the value of the interactive virtual item sent by the server will be will be.

In view of the above, in the present embodiment, by adding a live channel in an e-commerce application program, real time two-way interactions between an anchor user account and at least one audience user account by means of live video stream can be realized, thereby enhancing the live social attributes of e-commerce application program. In this way, audience user accounts are actively involved in the interaction procedure with the anchor user account, and thus the communication types between user accounts in the e-commerce application programs are enriched.

Figure 8:
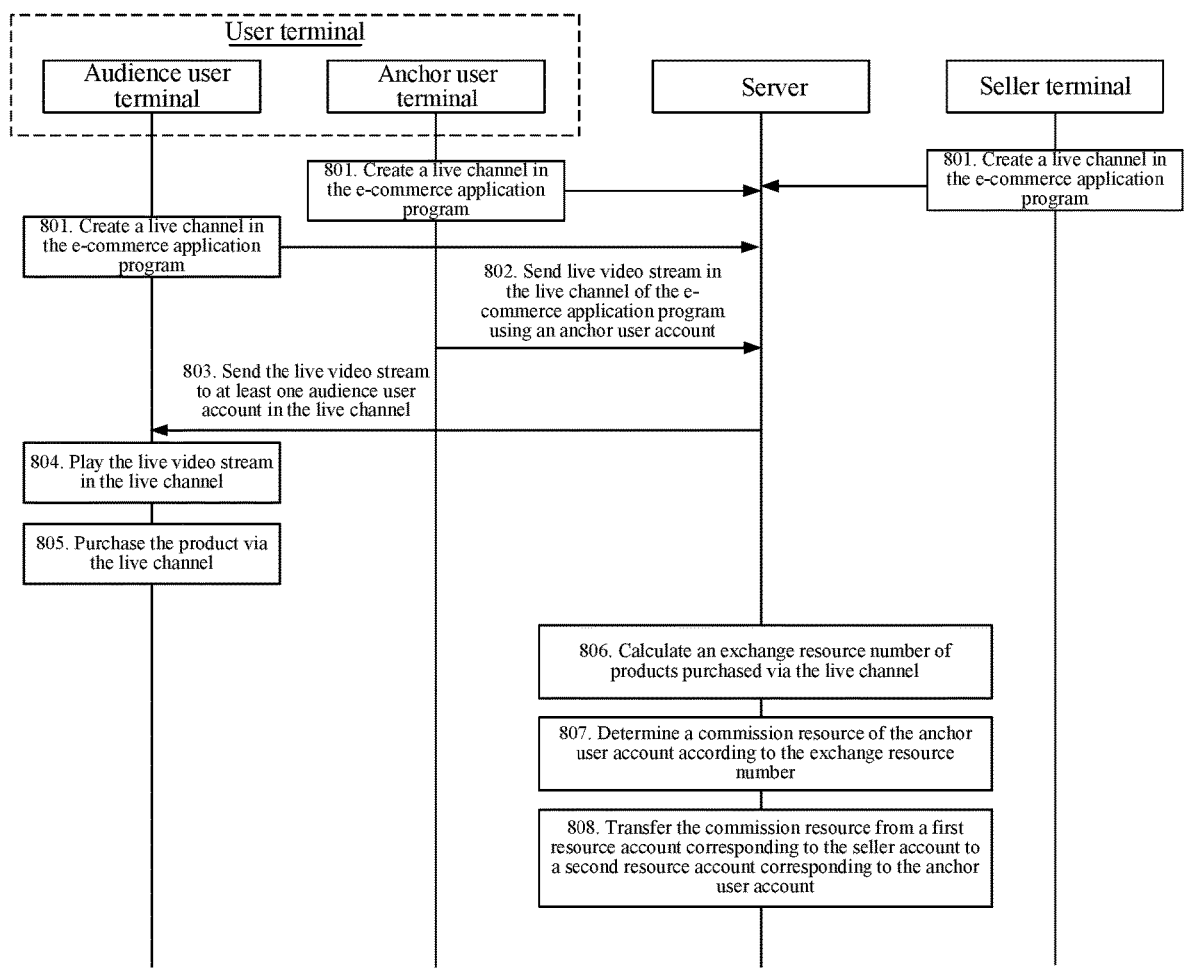
FIG. 8 is a flowchart showing an interactive method for an e-commerce application program according to another exemplary embodiment of the present disclosure.

FIG. 8 is a flowchart showing an interactive method for an e-commerce application program according to another exemplary embodiment of the present disclosure. In the embodiment, for example, the interactive method for an e-commerce application program is applied in the e-commerce system as shown in FIG. 1. The method includes the following steps.

In step 801, the seller terminal and/or the user terminal create a live channel in the e-commerce application program.

In the present embodiment, the e-commerce application program also provides live channels. Each live channel is a collection of groups configured to realize instant communications between at least two user accounts. User accounts which belong to the same live channel can send at least one of real time text messages, picture messages, voice messages, video messages, image-text messages, link messages, and geographic location messages to each other to conduct communications.

Optionally, each live channel corresponds to a product category, or a subject, or a hobby or interest, or an anchor.

Optionally, the seller terminal creates one or more live channels in the e-commerce application program using a seller account, or the user terminal creates one or more live channels in the e-commerce application program using a user account. The creator of a live channel has an administrative authority over the created group channel.

Optionally, user accounts can select to join a live channel on their own initiative so as to communicate with other user accounts.

In step 802, an anchor user terminal sends live video stream in the live channel of the e-commerce application program using an anchor user account.

The anchor user terminal may be one of a plurality of user terminals. The anchor user account has a live-broadcasting authority in the live channel of the e-commerce application program.

Optionally, the live video stream is configured for delivering live video contents relating to a predetermined product. For example, the live video stream is configured to test a new mobile phone, introduce performance of the mobile phone, exhibiting functions of the mobile phone, and so on.

Correspondingly, the server receives the live video stream sent from the anchor user account in the live channel of the e-commerce application program.

In step 803, the server sends the live video stream to at least one audience user account in the live channel.

Optionally, the server determines other user accounts in the live channel than the anchor user account as the audience user accounts.

The server sends the live video stream to at least one audience user account in a broadcast or multicast mode.

Correspondingly, the at least one audience user account receives, using the audience user accounts, the live video stream forwarded by the server.

In step 804, the at least one audience user terminal plays the live video stream in the live channel.

In step 805, the product is purchased by the at least one audience user terminal via the live channel.

Optionally, the at least one audience user terminal can trigger a jump process in the live channel to access a purchase interface for a product so that the product can be purchased. Optionally, the live channel provides a product information web page, and the product can be purchased on the product information web page by the at least one audience user terminal. At least one user account is logged into on the at least one audience user terminal.

The jump process and the product information web page in the live channel include the identification information of the anchor user account, and after the product is purchased in the e-commerce application program using the at least one audience user account, the server can record that the current purchase is performed via the live channel corresponding to the anchor user account.

In step 806, the server calculates an exchange resource number of products purchased via the live channel.

The exchange resource number of products includes the number, unit price, total price and premium of the products purchased by audience user terminals. Optionally, the server establishes a table listing exchange resource numbers of products corresponding to the anchor user account, and the exchange resource numbers of products purchased via each live channel corresponding to the anchor user account are recorded into the table. Optionally, the server collects commission calculation methods corresponding to the products provided by seller terminals in advance. The commission calculation methods include calculating the commission based on a percentage of a total price, calculating the commission based on the premium, or calculating the commission based on laddering amounts.

In step 807, the server determines a commission resource of the anchor user account according to the exchange resource number.

Optionally, the server determines the commission resource of the anchor user account according to the exchange resource number of the products and the commission calculation methods corresponding to the products provided by the seller terminal. The commission resource includes money, coupons, and credit score and the like.

For example, the unit price of a product Z is RMB 100, a total of ten of the products Z are sold, the total price is RMB 1000, and the commission calculation method is that $_{10}$% of the total price is calculated as the commission. Then, the server can determine that the commission resource of the anchor user account is RMB 100.

In step 808, the server transfers the commission resource from a first resource account corresponding to the seller account to a second resource account corresponding to the anchor user account.

For example, the server transfers the commission resource (i.e., RMB 100) from a first resource account corresponding to the seller account to a second resource account corresponding to the anchor user account.

In view of the above, in the present embodiment, by adding a live channel in an e-commerce application program, real time two-way interactions between an anchor user account and at least one audience user account by means of live video stream can be realized, thereby enhancing the live social attributes of e-commerce application program. Further, products are purchased by the audience user terminals via the live channel, products become more intuitive for users, and it is convenient for users to get good idea of properties of products. Thus, users' purchase for products is boosted, and purchase patterns of products are enriched. In addition, by providing the commission resource to the anchor user account, the interaction for the anchor to promote products is enhanced, which is benefit for selling and marketing of the products in the e-commerce application program.

Figure 9A:
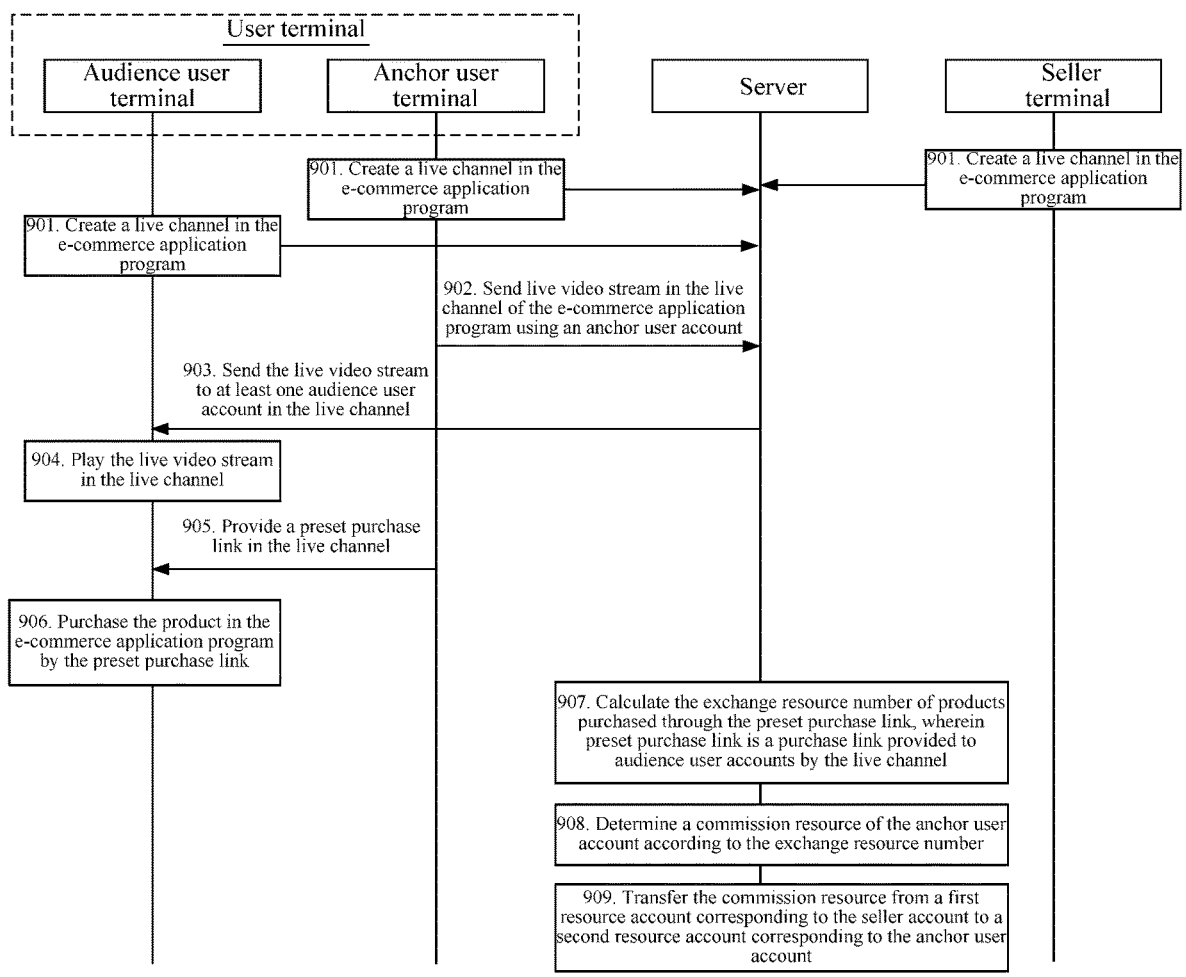
FIG. 9A is a flowchart showing an interactive method for an e-commerce application program according to another exemplary embodiment of the present disclosure.

FIG. 9A is a flowchart showing an interactive method for an e-commerce application program according to another exemplary embodiment of the present disclosure. In the embodiment, for example, the interactive method for an e-commerce application program is applied in the e-commerce system as shown in FIG. 1. The method includes the following steps.

In step 901, the seller terminal and/or the user terminal create a live channel in the e-commerce application program.

In the present embodiment, the e-commerce application program also provides live channels. Each live channel is a collection of groups configured to realize instant communications between at least two user accounts. User accounts which belong to the same live channel can send at least one of real time text messages, picture messages, voice messages, video messages, image-text messages, link messages, and geographic location messages to each other to conduct communications.

Optionally, each live channel corresponds to a product category, or a subject, or a hobby or interest, or an anchor.

Optionally, the seller terminal creates one or more live channels in the e-commerce application program using a seller account, or the user terminal creates one or more live channels in the e-commerce application program using a user account. The creator of a live channel has an administrative authority over the created group channel.

Optionally, user accounts can select to join a live channel on their own initiative so as to communicate with other user accounts.

In step 902, an anchor user terminal sends live video stream in the live channel of the e-commerce application program using an anchor user account.

The anchor user terminal may be one of a plurality of user terminals. The anchor user account has a live-broadcasting authority in the live channel of the e-commerce application program.

Optionally, the live video stream is configured for delivering live video contents relating to a predetermined product. For example, the live video stream is configured to test a new mobile phone, introduce performance of the mobile phone, exhibiting functions of the mobile phone, and so on.

Correspondingly, the server receives the live video stream sent from the anchor user account in the live channel of the e-commerce application program.

In step 903, the server sends the live video stream to at least one audience user account in the live channel.

Optionally, the server determines other user accounts in the live channel than the anchor user account as the audience user accounts.

The server sends the live video stream to at least one audience user account in a broadcast or multicast mode.

Correspondingly, the at least one audience user account receives, using the audience user accounts, the live video stream forwarded by the server.

In step 904, the at least one audience user terminal plays the live video stream in the live channel.

In step 905, the anchor user terminal provides a preset purchase link in the live channel.

Optionally, the anchor user terminal obtains a preset purchase link in advance. The preset purchase link carries identification information for identifying the anchor user account. The preset purchase link is configured for purchasing at least one designated products.

Optionally, the anchor user terminal provides the preset purchase link in a channel announcement column of the live channel in a text form, or the anchor user terminal provides the preset purchase link in a chat information column of the live channel in a form of chat message, or the anchor user terminal provides the preset purchase link in the live video stream of the live channel in a form of voice, picture or video.

The server provides the preset purchase link to the user audience user accounts in the live channel. The interface of the e-commerce application program corresponding to each user account displays the preset purchase link.

Figure 9B:
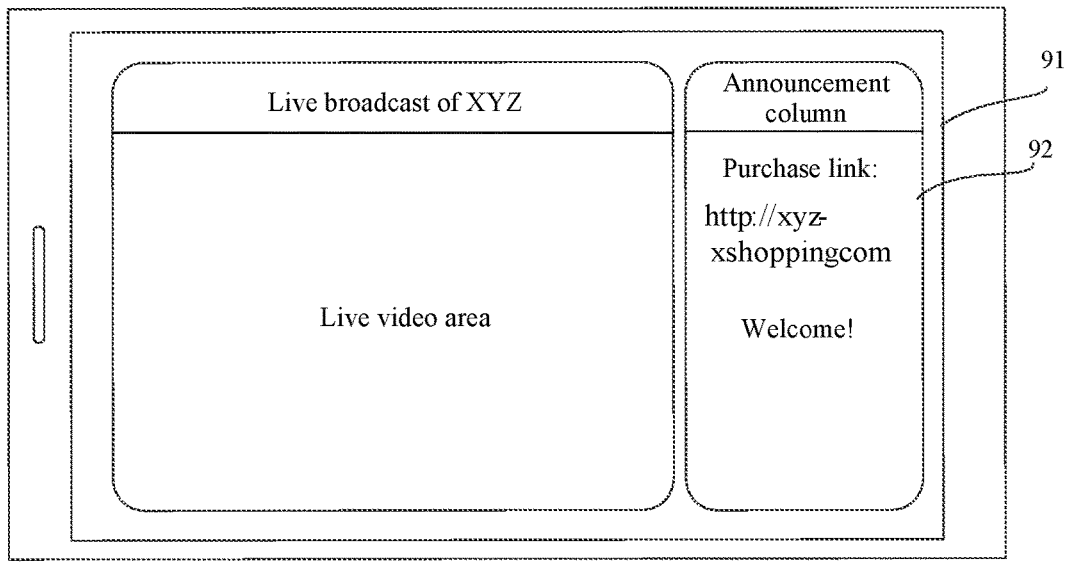
FIG. 9B is a schematic diagram showing an interface of a live channel according to another exemplary embodiment of the present disclosure.

For example, referring to FIG. 9B, the anchor user displays on an announcement column 92 of a live channel interface 91 a purchase link: http:xyz-xshopping.com.

Figure 9C:
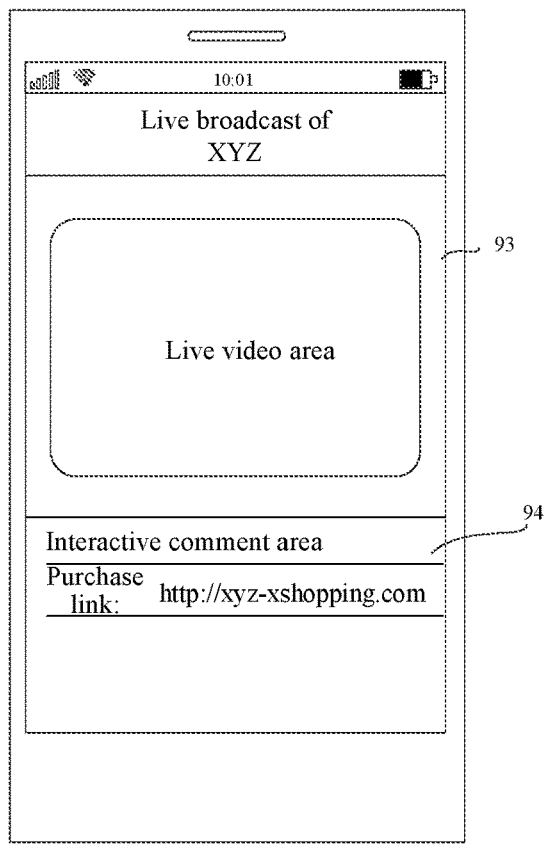
FIG. 9C is a schematic diagram showing an interface of a live channel according to another exemplary embodiment of the present disclosure.

As another example, referring to FIG. 9C, the anchor user displays on an interactive comment area 94 of a live channel interface 93 a purchase link: http:xyz-xshopping.com.

Figure 9D:
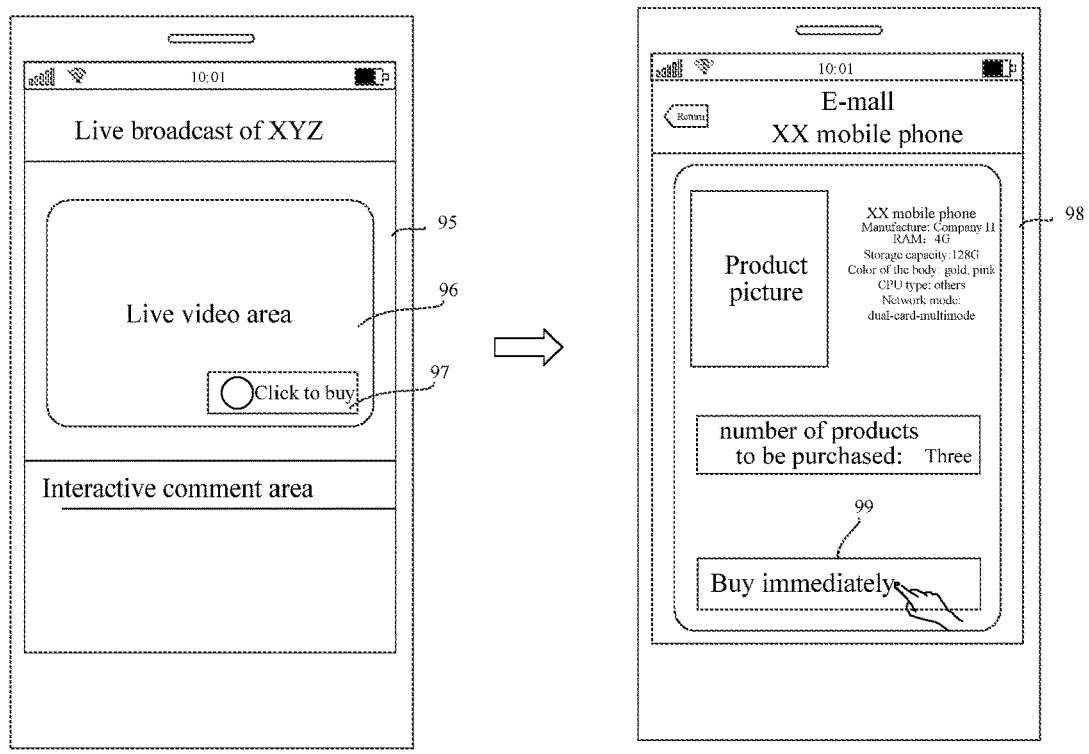
FIG. 9D is a schematic diagram showing an interface of a live channel according to another exemplary embodiment of the present disclosure.

As another example, referring to FIG. 9D, the anchor user provides a purchase entry 97 on a live video area 96 of a live channel interface 95 in a form of picture.

In step 906, the product in the e-commerce application program is purchased by at least one audience user terminal by the preset purchase link.

Optionally, at least one audience user terminal jumps to a product purchase web page in the e-commerce application program by the preset purchase link, and then conducts product purchase in the e-commerce application program. At least one audience user account is logged in on the at least one audience user terminal.

For example, an audience user terminal may trigger the purchase entry 97 in FIG. 9D, the e-commerce application program jumps to a product purchase web page 98, and then a button 99 which shown as "Buy immediately" on the purchase interface 98 provided by the e-commerce application program can be clicked or tapped to purchase the product.

The preset purchase link includes the identification information of the anchor user account, and thus after the product is purchased by the audience user account in the e-commerce application program, the server can record that the current purchase is conducted by the preset purchase link provided by the anchor user account.

Optionally, this step can be performed by a plurality of audience user accounts in the live channel at the same or different time points.

In step 907, the server calculates the exchange resource number of products purchased through the preset purchase link. The preset purchase link is a purchase link provided to audience user accounts by the live channel.

Optionally, the exchange resource number of products includes the number, unit price, total price and premium of the products purchased by audience user terminals. Optionally, the server establishes a table listing exchange resource numbers of products corresponding to the anchor user account, and the exchange resource numbers of products purchased via each live channel corresponding to the anchor user account are recorded into the table. Optionally, the server collects commission calculation methods corresponding to the products provided by seller terminals in advance. The commission calculation methods include calculating the commission based on a percentage of a total price, calculating the commission based on the premium, or calculating the commission based on laddering amounts.

The preset purchase link includes the identification information of the anchor user account, and thus the server can calculates the exchange resource number of products purchased through the preset purchase link provided by the anchor user account.

In step 908, the server determines a commission resource of the anchor user account according to the exchange resource number.

Optionally, the server determines the commission resource of the anchor user account according to the exchange resource number of the products and the commission calculation methods corresponding to the products provided by the seller terminal. The commission resource includes money, coupons, and credit score and the like.

In step 909, the server transfers the commission resource from a first resource account corresponding to the seller account to a second resource account corresponding to the anchor user account.

In view of the above, in the present embodiment, by adding a live channel in an e-commerce application program, real time two-way interactions between an anchor user account and at least one audience user account by means of live video stream can be realized, thereby enhancing the live social attributes of e-commerce application program. Further, products are purchased by the audience user terminals through a preset purchase link, convenience for purchasing products is improved, and thus users' purchase for products is boosted, and purchase patterns of products are enriched. In addition, by providing the commission resource to the anchor user account, the interaction for the anchor to promote products is enhanced, which is benefit for selling and marketing of the products in the e-commerce application program.

Figure 10A:
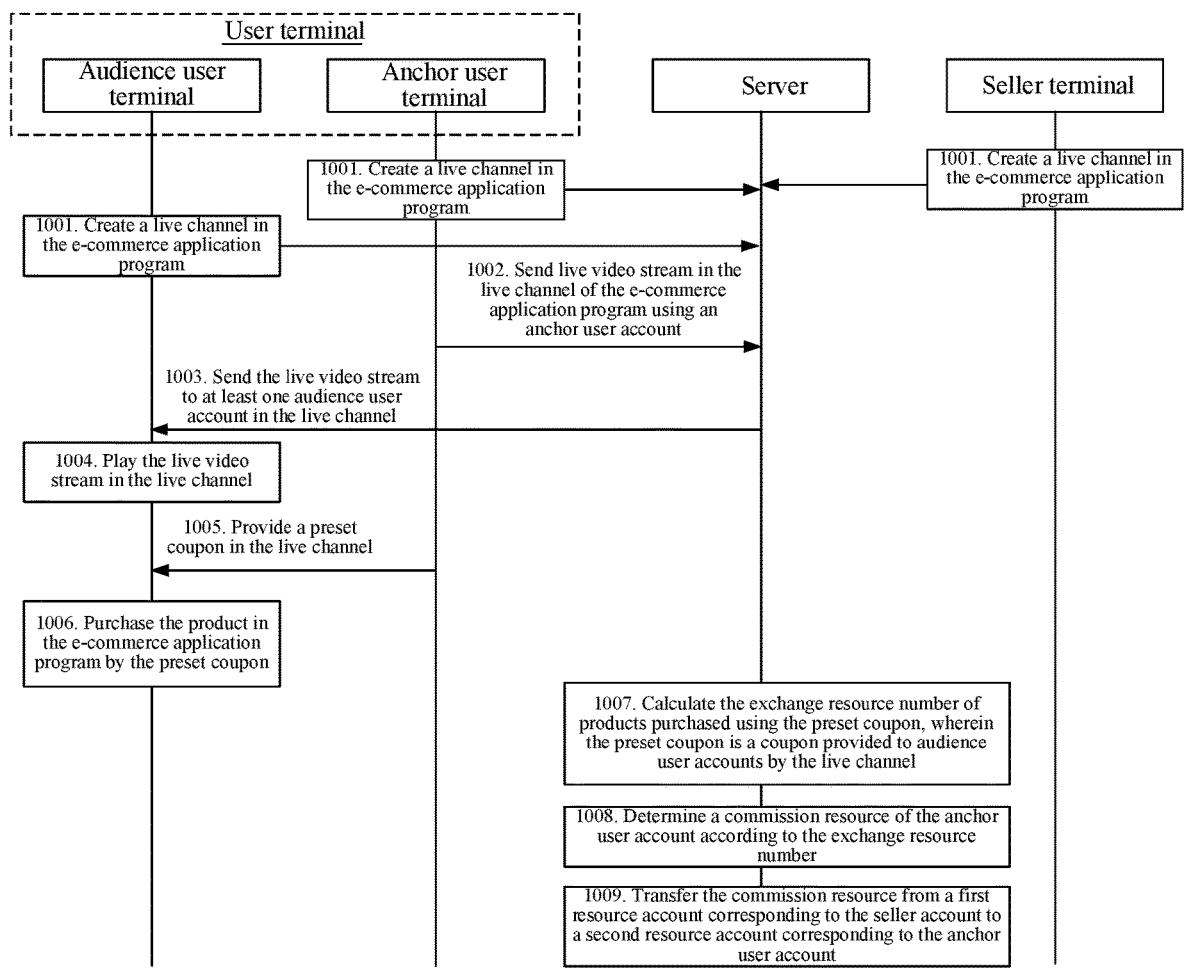
FIG. 10A is a flowchart showing an interactive method for an e-commerce application program according to another exemplary embodiment of the present disclosure.

FIG. 10A is a flowchart showing an interactive method for an e-commerce application program according to another exemplary embodiment of the present disclosure. In the embodiment, for example, the interactive method for an e-commerce application program is applied in the e-commerce system as shown in FIG. 1. The method includes the following steps.

In step 1001, the seller terminal and/or the user terminal create a live channel in the e-commerce application program.

In the present embodiment, the e-commerce application program also provides live channels. Each live channel is a collection of groups configured to realize instant communications between at least two user accounts. User accounts which belong to the same live channel can send at least one of real time text messages, picture messages, voice messages, video messages, image-text messages, link messages, and geographic location messages to each other to conduct communications.

Optionally, each live channel corresponds to a product category, or a subject, or a hobby or interest, or an anchor.

Optionally, the seller terminal creates one or more live channels in the e-commerce application program using a seller account, or the user terminal creates one or more live channels in the e-commerce application program using a user account. The creator of a live channel has an administrative authority over the created group channel.

Optionally, user accounts can select to join a live channel on their own initiative so as to communicate with other user accounts.

In step 1002, an anchor user terminal sends live video stream in the live channel of the e-commerce application program using an anchor user account.

The anchor user terminal may be one of a plurality of user terminals. The anchor user account has a live-broadcasting authority in the live channel of the e-commerce application program.

Optionally, the live video stream is configured for delivering live video contents relating to a predetermined product. For example, the live video stream is configured to test a new mobile phone, introduce performance of the mobile phone, exhibiting functions of the mobile phone, and so on.

Correspondingly, the server receives the live video stream sent from the anchor user account in the live channel of the e-commerce application program.

In step 1003, the server sends the live video stream to at least one audience user account in the live channel.

Optionally, the server determines other user accounts in the live channel than the anchor user account as the audience user accounts.

The server sends the live video stream to at least one audience user account in a broadcast or multicast mode.

Correspondingly, the at least one audience user account receives, using the audience user accounts, the live video stream forwarded by the server.

In step 1004, the at least one audience user terminal plays the live video stream in the live channel.

In step 1005, the anchor user terminal provides a preset coupon in the live channel.

Optionally, the anchor user terminal obtains a preset coupon from the seller account in advance. The preset coupon carries identification information configured for identifying the anchor user account, or there is a correspondence between the preset coupon and the anchor user terminal in the server. The preset coupon is configured for purchasing at least one of designated products.

Optionally, the anchor user terminal provides the preset coupon in a channel announcement column of the live channel in a text form, or the anchor user terminal provides the preset coupon in a chat information column of the live channel in a form of chat message, or the anchor user terminal provides the preset coupon in the live video stream of the live channel in a form of voice, picture or video.

The server provides the preset coupon to the audience user accounts in the live channel. The interface of the e-commerce application program corresponding to each user account displays the preset coupon.

Figure 10B:
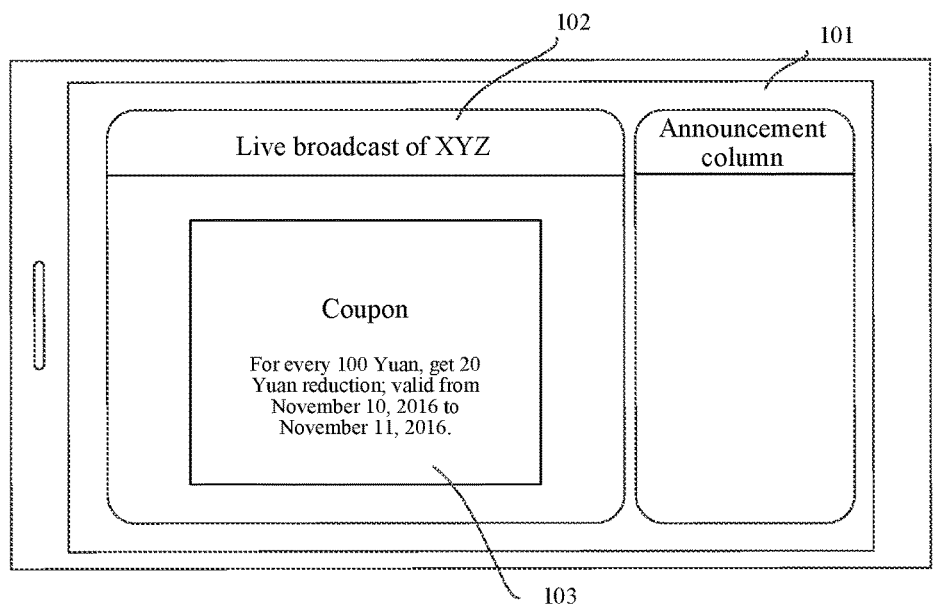
FIG. 10B is a schematic diagram showing an interface of a live channel according to another exemplary embodiment of the present disclosure.

Referring to FIG. 10B, the anchor user provides a coupon 103 on a live video area 102 of a live channel interface 101 in a form of picture.

In step 1006, the product in the e-commerce application program is purchased by at least one audience user terminal by the preset coupon.

Optionally, product purchase is performed by at least one audience user terminal in the e-commerce application program using the preset coupon. At least one audience user account is logged in on the at least one audience user terminal. Optionally, the at least one audience user terminal triggers the preset coupon to jump to a product purchase web page in the e-commerce application program, and then conducts product purchase in the e-commerce application program.

Optionally, this step can be performed by a plurality of audience user accounts in the live channel at the same or different time points.

In step 1007, the server calculates the exchange resource number of products purchased using the preset coupon. The preset coupon is a coupon provided to audience user accounts by the live channel.

The exchange resource number of products includes the number, unit price, total price and premium of the products purchased by audience user terminals. Optionally, the server collects commission calculation methods corresponding to the products provided by seller terminals in advance. The commission calculation methods include calculating the commission based on a percentage of a total price, calculating the commission based on the premium, or calculating the commission based on laddering amounts.

In step 1008, the server determines a commission resource of the anchor user account according to the exchange resource number.

Optionally, the server determines the commission resource of the anchor user account according to the exchange resource number and the commission calculation methods corresponding to the products.

In step 1009, the server transfers the commission resource from a first resource account corresponding to the seller account to a second resource account corresponding to the anchor user account.

In view of the above, in the present embodiment, by adding a live channel in an e-commerce application program, real time two-way interactions between an anchor user account and at least one audience user account by means of live video stream can be realized, thereby enhancing the live social attributes of e-commerce application program. Further, products are purchased by the audience user terminals using a preset coupon, users' purchase for products is boosted, and purchase patterns of products are enriched. In addition, by providing the commission resource to the anchor user account, the interaction for the anchor to promote products is enhanced, which is benefit for selling and marketing of the products in the e-commerce application program.

Figure 11A:
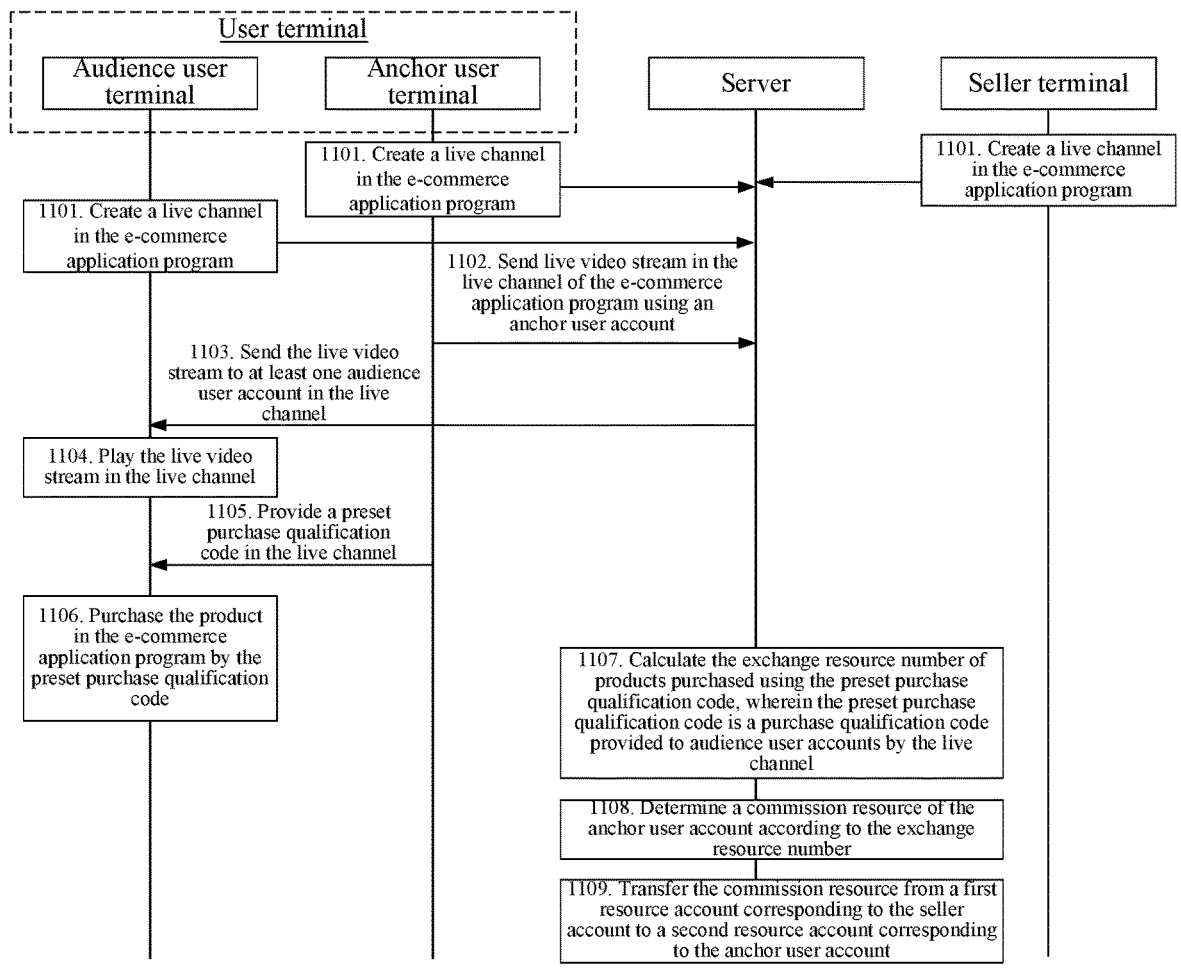
FIG. 11A is a flowchart showing an interactive method for an e-commerce application program according to another exemplary embodiment of the present disclosure.

FIG. 11 is a flowchart showing an interactive method for an e-commerce application program according to another exemplary embodiment of the present disclosure. In the embodiment, for example, the interactive method for an e-commerce application program is applied in the e-commerce system as shown in FIG. 1. The method includes the following steps.

In step 1101, the seller terminal and/or the user terminal create a live channel in the e-commerce application program.

In the present embodiment, the e-commerce application program also provides live channels. Each live channel is a collection of groups configured to realize instant communications between at least two user accounts. User accounts which belong to the same live channel can send at least one of real time text messages, picture messages, voice messages, video messages, image-text messages, link messages, and geographic location messages to each other to conduct communications.

Optionally, each live channel corresponds to a product category, or a subject, or a hobby or interest, or an anchor.

Optionally, the seller terminal creates one or more live channels in the e-commerce application program using a seller account, or the user terminal creates one or more live channels in the e-commerce application program using a user account. The creator of a live channel has an administrative authority over the created group channel.

Optionally, user accounts can select to join a live channel on their own initiative so as to communicate with other user accounts.

In step 1102, an anchor user terminal sends live video stream in the live channel of the e-commerce application program using an anchor user account.

The anchor user terminal may be one of a plurality of user terminals. The anchor user account has a live-broadcasting authority in the live channel of the e-commerce application program.

Optionally, the live video stream is configured for delivering live video contents relating to a predetermined product. For example, the live video stream is configured to test a new mobile phone, introduce performance of the mobile phone, exhibiting functions of the mobile phone, and so on.

Correspondingly, the server receives the live video stream sent from the anchor user account in the live channel of the e-commerce application program.

In step 1103, the server sends the live video stream to at least one audience user account in the live channel.

Optionally, the server determines other user accounts in the live channel than the anchor user account as the audience user accounts.

The server sends the live video stream to at least one audience user account in a broadcast or multicast mode.

Correspondingly, the at least one audience user account receives, using the audience user accounts, the live video stream forwarded by the server.

In step 1104, the at least one audience user terminal plays the live video stream in the live channel.

In step 1105, the anchor user terminal provides a preset purchase qualification code in the live channel.

Optionally, the anchor user terminal obtains a preset purchase qualification code from the seller account in advance. The preset purchase qualification code carries identification information configured for identifying the anchor user account, or there is a correspondence between the preset purchase qualification code and the anchor user terminal in the server. The preset purchase qualification code is configured for purchasing at least one of designated products.

Optionally, the anchor user terminal provides the preset purchase qualification code in a channel announcement column of the live channel in a text form, or the anchor user terminal provides the preset purchase qualification code in a chat information column of the live channel in a form of chat message, or the anchor user terminal provides the preset purchase qualification code in the live video stream of the live channel in a form of voice, picture or video.

The server provides the preset purchase qualification code to the audience user accounts in the live channel. The interface of the e-commerce application program corresponding to each user account displays the preset purchase qualification code.

Figure 11B:
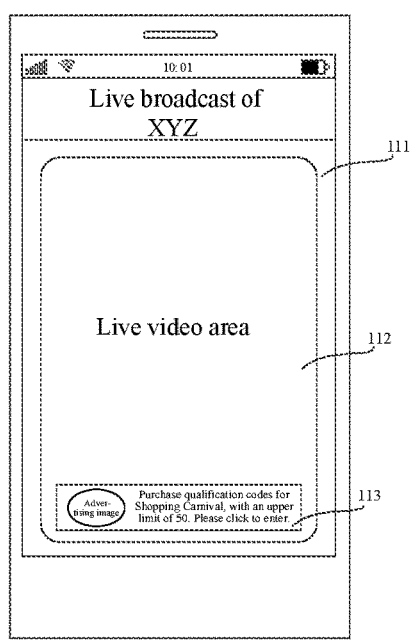
FIG. 11B is a schematic diagram showing an interface of a live channel according to another exemplary embodiment of the present disclosure.

Referring to FIG. 11B, the anchor user provides a preset purchase qualification code 113 on a live video area 112 of a live channel interface 111 in a form of picture.

In step 1106, the product in the e-commerce application program is purchased by at least one audience user terminal by the preset purchase qualification code.

Optionally, product purchase is performed by at least one audience user terminal in the e-commerce application program using the preset purchase qualification code. At least one audience user account is logged in on the at least one audience user terminal. Optionally, the at least one audience user terminal triggers the preset purchase qualification code to jump to a product purchase web page in the e-commerce application program, and then conducts product purchase in the e-commerce application program.

Optionally, this step can be performed by a plurality of audience user accounts in the live channel at the same or different time points.

In step 1107, the server calculates the exchange resource number of products purchased using the preset purchase qualification code. The preset purchase qualification code is a purchase qualification code provided to audience user accounts by the live channel.

The exchange resource number of products includes the number, unit price, total price and premium of the products purchased by audience user terminals. Optionally, the server collects commission calculation methods corresponding to the products provided by seller terminals in advance. The commission calculation methods include calculating the commission based on a percentage of a total price, calculating the commission based on the premium, or calculating the commission based on laddering amounts.

In step 1108, the server determines a commission resource of the anchor user account according to the exchange resource number.

Optionally, the server determines the commission resource of the anchor user account according to the exchange resource number and the commission calculation methods corresponding to the products.

In step 1109, the server transfers the commission resource from a first resource account corresponding to the seller account to a second resource account corresponding to the anchor user account.

In view of the above, in the present embodiment, by adding a live channel in an e-commerce application program, real time two-way interactions between an anchor user account and at least one audience user account by means of live video stream can be realized, thereby enhancing the live social attributes of e-commerce application program. Further, products are purchased by the audience user terminals using a preset purchase qualification code, users' purchase for products is boosted, and purchase patterns of products are enriched. In addition, by providing the commission resource to the anchor user account, the interaction for the anchor to promote products is enhanced, which is benefit for selling and marketing of the products in the e-commerce application program.

Figure 12:
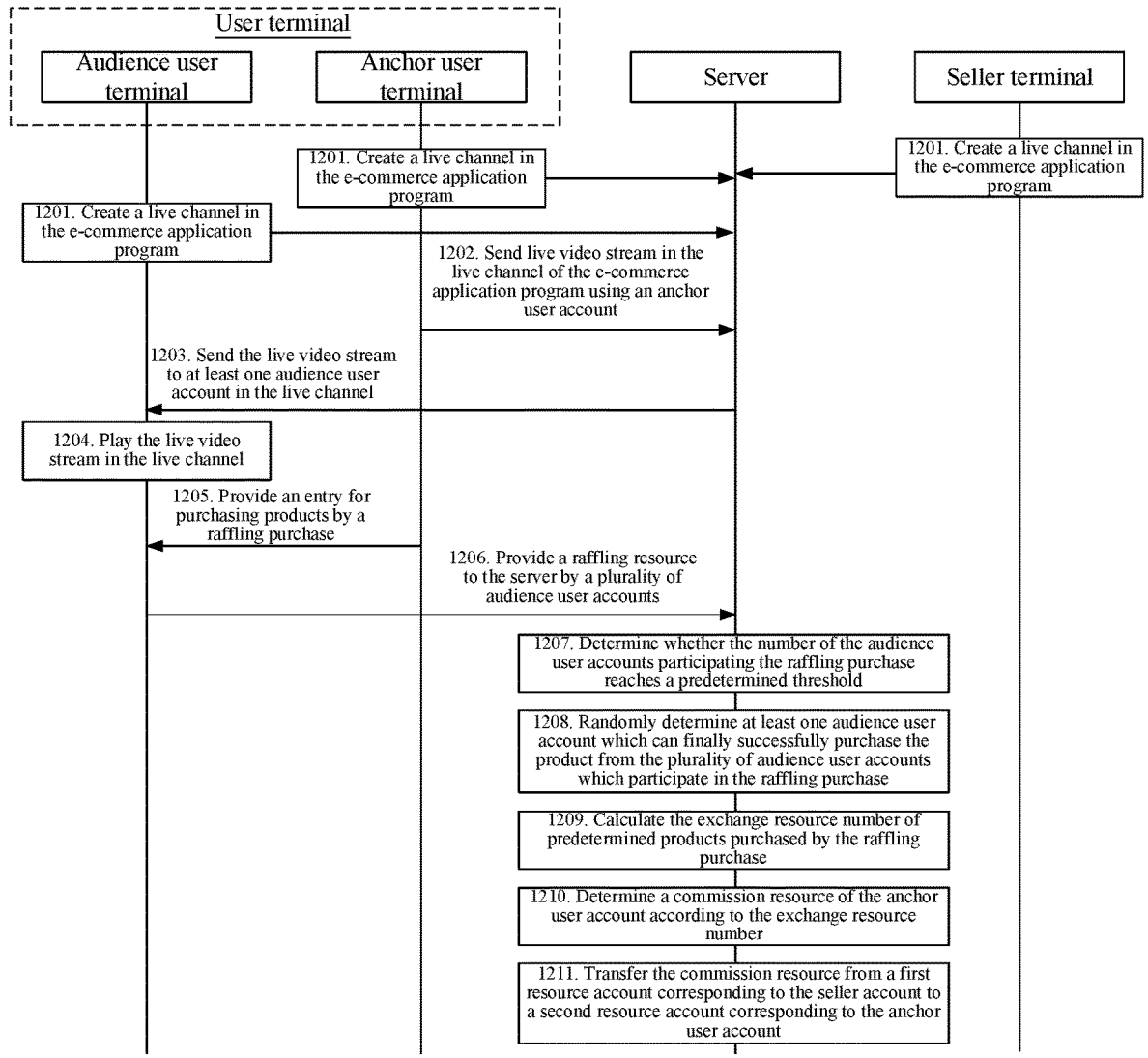
FIG. 12 is a flowchart showing an interactive method for an e-commerce application program according to another exemplary embodiment of the present disclosure.

FIG. 12 is a flowchart showing an interactive method for an e-commerce application program according to another exemplary embodiment of the present disclosure. In the embodiment, for example, the interactive method for an e-commerce application program is applied in the e-commerce system as shown in FIG. 1. The method includes the following steps.

In step 1201, the seller terminal and/or the user terminal create a live channel in the e-commerce application program.

In the present embodiment, the e-commerce application program also provides live channels. Each live channel is a collection of groups configured to realize instant communications between at least two user accounts. User accounts which belong to the same live channel can send at least one of real time text messages, picture messages, voice messages, video messages, image-text messages, link messages, and geographic location messages to each other to conduct communications.

Optionally, each live channel corresponds to a product category, or a subject, or a hobby or interest, or an anchor.

Optionally, the seller terminal creates one or more live channels in the e-commerce application program using a seller account, or the user terminal creates one or more live channels in the e-commerce application program using a user account. The creator of a live channel has an administrative authority over the created group channel.

Optionally, user accounts can select to join a live channel on their own initiative so as to communicate with other user accounts.

In step 1202, an anchor user terminal sends live video stream in the live channel of the e-commerce application program using an anchor user account.

The anchor user terminal may be one of a plurality of user terminals. The anchor user account has a live-broadcasting authority in the live channel of the e-commerce application program.

Optionally, the live video stream is configured for delivering live video contents relating to a predetermined product. For example, the live video stream is configured to test a new mobile phone, introduce performance of the mobile phone, exhibiting functions of the mobile phone, and so on.

Correspondingly, the server receives the live video stream sent from the anchor user account in the live channel of the e-commerce application program.

In step 1203, the server sends the live video stream to at least one audience user account in the live channel.

Optionally, the server determines other user accounts in the live channel than the anchor user account as the audience user accounts.

The server sends the live video stream to at least one audience user account in a broadcast or multicast mode.

Correspondingly, the at least one audience user terminal receives, using the audience user accounts, the live video stream forwarded by the server.

In step 1204, the at least one audience user terminal plays the live video stream in the live channel.

In step 1205, the anchor user terminal provides an entry for purchasing products by a raffling purchase.

Optionally, the anchor user terminal obtains transaction information about purchasing of products by a raffling purchase from the seller account in advance, and displays an entry for purchasing the products by the raffling purchase in the live channel. Optionally, the anchor user terminal may determine the raffling resource in advance, including cash, character strings, voice and the like.

For example, the anchor may provide an entry for purchasing products by a raffling purchase on a live video area of a live channel interface, and a user may trigger a button to participate the raffling purchase.

In step 1206, a plurality of audience user terminals provide a raffling resource to the server.

For example, there are 320 audience user terminals each of which provides RMB 1 in cash to the server.

In step 1207, the server determines whether the number of the audience user accounts participating the raffling purchase reaches a predetermined threshold.

The predetermined threshold may be a threshold which is preset by the seller terminal or the anchor user terminal. For example, the predetermined threshold may be RMB 300.

In step 1208, if the number of the audience user accounts participating the raffling purchase reaches the predetermined threshold, the server randomly determine at least one audience user account which can finally successfully purchase the product from the plurality of audience user accounts which participate in the raffling purchase. For example, if the total of the raffling resources provided by the plurality of audience user terminals to the server reaches the predetermined threshold of RMB 300, the server randomly determines an audience user account K, an audience user account V and an audience user account L as the audience user account which can finally successfully purchase the products.

In step 1209, the server calculates the exchange resource number of predetermined products purchased by the raffling purchase.

The exchange resource number of products includes the number, unit price, total price and premium of the products purchased by audience user terminals. Optionally, the server collects commission calculation methods corresponding to the products provided by seller terminals in advance. The commission calculation methods include calculating the commission based on a percentage of a total price, calculating the commission based on the premium, or calculating the commission based on laddering amounts.

For example, the server calculates the exchange resource number of predetermined products purchased by the raffling purchase as RMB 320.

In step 1210, the server determines a commission resource of the anchor user account according to the exchange resource number.

Optionally, the server determines the commission resource of the anchor user account according to the exchange resource number and the commission calculation methods corresponding to the products.

For example, assuming that the exchange resource number is RMB 320, the commission calculation method is that 10% of the total amount and 50% of the premium serve as the commission, the server can determine that the commission resource corresponding to the anchor user account is RMB 42.

In step 1211, the server transfers the commission resource from a first resource account corresponding to the seller account to a second resource account corresponding to the anchor user account.

For example, the server transfers RMB 42 from a first resource account corresponding to the seller account to a second resource account corresponding to the anchor user account.

In view of the above, in the present embodiment, by adding a live channel in an e-commerce application program, real time two-way interactions between an anchor user account and at least one audience user account by means of live video stream can be realized, thereby enhancing the live social attributes of e-commerce application program. Further, products are purchased by the audience user terminals using an entry which enables users to purchase products by a raffling purchase, user participation degree is improved, users' purchase for products is boosted, and purchase patterns of products are enriched. In addition, by providing the commission resource to the anchor user account, the interaction for the anchor to promote products is enhanced, which is benefit for selling and marketing of the products in the e-commerce application program.

Embodiments of devices of the present disclosure, which are configured to perform the embodiments of methods as described above, will be described below. Details not disclosed in the embodiments of the devices of the present disclosure can be found in the above descriptions about the embodiments of the methods.

Figure 13:
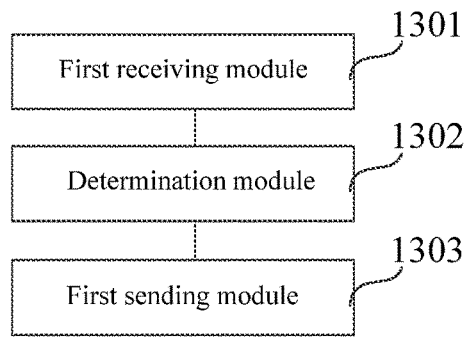
FIG. 13 is a block diagram showing an interactive device for an e-commerce application program according to another exemplary embodiment of the present disclosure.

FIG. 13 is a block diagram showing an interactive device for an e-commerce application program according to another exemplary embodiment of the present disclosure. The interactive device for an e-commerce application program can be implemented as a part or whole of a server by software, hardware or a combination thereof. The interactive device for an e-commerce application program may include a first receiving module 1301, a determination module 1302 and a first sending module 1303.

The first receiving module 1301 is configured to receive an interactive virtual item sent from a seller account in an interactive channel of the e-commerce application program, wherein the interactive channel is a collection of groups configured to realize instant communications between the seller account and at least one user account, and the interactive channel corresponds to a product category in the e-commerce application program.

The determination module 1302 is configured to determine the at least one user account in the interactive channel.

The first sending module 1303 is configured to send the interactive virtual item to the at least one user account in the interactive channel.

In view of the above, in the present embodiment, by adding into an e-commerce application program an interactive channel which supports instant communications and sending by a seller account an interactive virtual item to a user account which is interested in a product category via the interactive channel, instant interactions between seller accounts and user accounts can be realized. Also, a user account can collectively and efficiently obtain information relating to a product category of interest, thereby enriching the communication types between users and sellers and improving communication efficiency.

Figure 14:
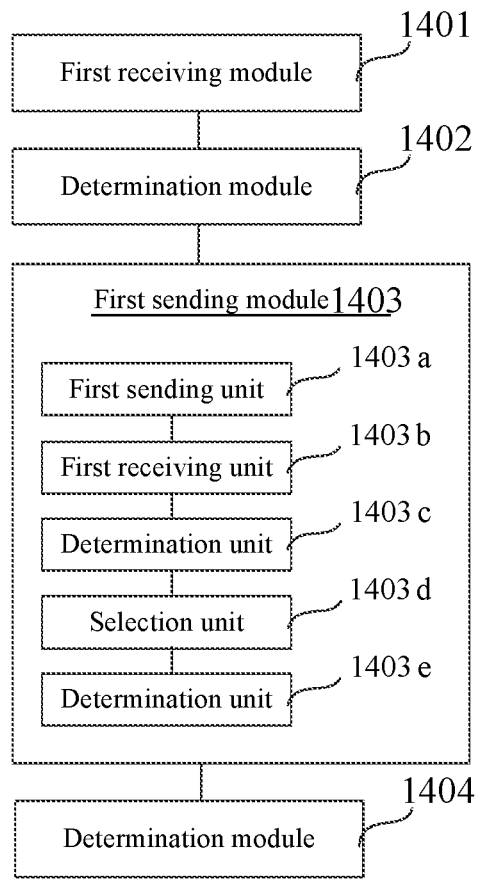
FIG. 14 is a block diagram showing an interactive device for an e-commerce application program according to another exemplary embodiment of the present disclosure.

FIG. 14 is a block diagram showing an interactive device for an e-commerce application program according to another exemplary embodiment of the present disclosure. The interactive device for the e-commerce application program can be implemented as a part or whole of a server by software, hardware or a combination thereof. The interactive device for the e-commerce application program may include a first receiving module 1401, a determination module 1402 and a first sending module 1403.

The first receiving module 1401 is configured to receive an interactive virtual item sent from a seller account in an interactive channel of the e-commerce application program, wherein the interactive channel is a collection of groups configured to realize instant communications between the seller account and at least one user account, and the interactive channel corresponds to a product category in the e-commerce application program.

The determination module 1402 is configured to determine the at least one user account in the interactive channel.

The first sending module 1403 is configured to send the interactive virtual item to the at least one user account in the interactive channel.

According to an embodiment, the interactive virtual item includes a first virtual item which corresponds to a prize-obtaining character string.

The first sending module 1403 includes a first sending unit 1403a, a first receiving unit 1403b, and a determination unit 1403c.

The first sending unit 1403a is configured to send a prize-obtaining message to the at least one user account in the interactive channel, wherein the prize-obtaining message carries the prize-obtaining character string.

The first receiving unit 1403b is configured to receive a text message returned from the at least one user account.

The determination unit 1403c is configured to determine whether a content of the text message includes the prize-obtaining character string.

The first sending unit 1403a is configured to, if the content of the text message includes the prize-obtaining character string, send the first virtual item to the at least one user account.

According to an embodiment, the interactive virtual item includes a second virtual item which is sent randomly.

The first sending module 1403 includes a selection unit 1403d and the first sending unit 1403a.

The selection unit 1403d is configured to randomly select at least one target user account from the at least one user account in the interactive channel.

The first sending unit 1403a is configured to send the second virtual item to the selected at least one target user account.

According to an embodiment, the interactive virtual item includes third virtual items, and the number of the third virtual items is predetermined.

The first sending module 1403 includes the first sending unit 1403a, the first receiving unit 1403b, and a determination unit 1403e.

The first sending unit 1403a is configured to send a virtual item package to the at least one user account in the interactive channel, wherein the virtual item package is configured for obtaining the third virtual items.

The first receiving unit 1403b is configured to receive a request for obtaining the virtual item package sent from a user account.

The determination unit 1403e is configured to determine whether there exists a third virtual item which has not been obtained yet.

The first sending unit 1403a is configured to, if there exists the third virtual item which has not been obtained yet, send the third virtual items to the user account sending the request.

According to an embodiment, the device further includes a first receiving module 1401, a determination module 1402, and a first sending module 1403.

The first receiving module 1401 is configured to receive chat messages sent from a first user account in a group channel of the e-commerce application program, wherein the group channel is a chat channel established by the seller account or the at least one user account in the e-commerce application program.

The determination module 1402 is configured to determine a second user account in the group channel.

The first sending module 1403 is configured to send the chat messages to the second user account in the group channel.

According to an embodiment, the device further includes a first receiving module 1401, and a first sending module 1403.

The first receiving module 1401 is configured to receive a live video stream sent from an anchor user account in a live channel of the e-commerce application program, wherein the live video stream is configured for delivering live video contents relating to a predetermined product.

The first sending module 1403 is configured to send the live video stream to an audience user account in the live channel.

According to an embodiment, the device further includes a determination module 1404, and a first sending module 1403.

The determination module 1404 is configured to determine whether attribute data generated by the anchor user account in the live channel reaches a predetermined threshold.

The first sending module 1403 is configured to, if the attribute data reaches the predetermined threshold, increase an account level of the anchor user account, and/or send an interactive item to the anchor user account.

The attribute data includes the number of people who follow the live channel, and/or the number of simultaneous online people.

According to an embodiment, the device further includes a calculation module 1406, a determination module 1402, and a transferring module 1407.

The calculation module 1406 is configured to calculate an exchange resource number of products purchased via the live channel.

The determination module 1402 is configured to determine a commission resource of the anchor user account according to the exchange resource number.

The transferring module 1407 is configured to transfer the commission resource from a first resource account corresponding to the seller account to a second resource account corresponding to the anchor user account.

According to an embodiment, the calculation module 1407 is configured to calculate the exchange resource number of products purchased through a preset purchase link, wherein the preset purchase link is a purchase link provided to the audience user account by the live channel.

Alternatively, the calculation module 1407 is configured to calculate the exchange resource number of products purchased using a preset coupon, wherein the preset coupon is a coupon provided to the audience user account by the live channel.

Alternatively, the calculation module 1407 is configured to calculate the exchange resource number of products purchased using a preset purchase qualification code, wherein the preset purchase qualification code is a purchase qualification code provided to the audience user account by the live channel.

Alternatively, the calculation module 1407 is configured to calculate the exchange resource number of products purchased by a raffling purchase, wherein the raffling purchase refers to a purchase manner of randomly determining an audience user account which finally purchases successfully from audience user accounts providing raffling resources to a server.

In view of the above, in the present embodiment, a user terminal watches a product category, a seller account sends an interactive virtual item to the user account via an interactive channel, and the user terminal receives the interactive virtual item sent from the seller account in the interactive channel. This realizes a real time two-way interactive between seller accounts and user account, thereby enhancing the social attributes of e-commerce application programs. In this way, user accounts are actively involved in the interaction procedure, and thus the communication types between users and sellers are enriched.

Further, a seller account sends a first virtual item to at least one user account via an interactive channel, and a user account inputs a corresponding prize-obtaining string to obtain the first virtual item. Or, second virtual items are sent from a seller account to at least one user account via an interactive channel, and a server randomly sends the second virtual items to target user accounts. Or, third virtual items are sent to at least one user account from a seller account via an interactive channel, a request for obtaining the third virtual items may be sent manually using a user account, and then the third virtual items can be obtained at different times, that is to say, those user accounts which send the request earlier can obtain the third virtual items. This realizes real time two-way interactions between the seller account and the at least one user account, thereby enhancing the social attributes of e-commerce application programs. In this way, user accounts are actively involved in the interaction procedure, and thus the communication types between users and sellers are enriched.

In addition, by providing a group channel in an e-commerce application program, individual user accounts in the e-commerce application accounts can communicate with each other in real time. Thus, as compared with conventional comment systems in e-commerce application programs, the present embodiment increases the social attribute of the e-commerce application program, and enriches the communication types between user accounts in the e-commerce application program.

Also, by adding a live channel in an e-commerce application program, real time two-way interactions between an anchor user account and at least one audience user account by means of live video stream can be realized, thereby enhancing the live social attributes of e-commerce application program. In this way, audience user accounts are actively involved in the interaction procedure with the anchor user account, and thus the communication types between user accounts in the e-commerce application programs are enriched. Products are purchased by the audience user terminals via the live channel, products become more intuitive for users, and it is convenient for users to have an idea of properties of products. Thus, users' purchase for products is boosted, and purchase patterns of products are enriched. In addition, by providing the commission resource to the anchor user account, the interaction for the anchor to promote products is enhanced, which is benefit for selling and marketing of the products in the e-commerce application program.

Figure 15:
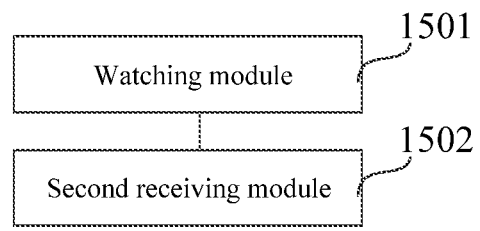
FIG. 15 is a block diagram showing an interactive device for an e-commerce application program according to another exemplary embodiment of the present disclosure.

FIG. 15 is a block diagram showing an interactive device for an e-commerce application program according to another exemplary embodiment of the present disclosure. The interactive device for an e-commerce application program can be implemented as a part or whole of a user terminal by software, hardware or a combination thereof. The interactive device for an e-commerce application program may include a watching module 1501, and a second receiving module 1502.

The watching module 1501 is configured to watch a product category in an e-commerce application program, wherein the product category corresponds to an interactive channel in the e-commerce application program, and the interactive channel is a collection of groups configured to realize instant communications between a seller account and at least one user account.

The second receiving module 1502 is configured to receive an interactive virtual item sent from the seller account in the interactive channel.

In view of the above, in the present embodiment, a user terminal watches a product category, a seller account sends an interactive virtual item to the user account via an interactive channel, and the user terminal receives the interactive virtual item sent from the seller account in the interactive channel. This realizes a real time two-way interactive between seller accounts and at least one user account, thereby enhancing the social attributes of e-commerce application programs. In this way, user accounts are actively involved in the interaction procedure, and thus the communication types between users and sellers are enriched.

Figure 16:
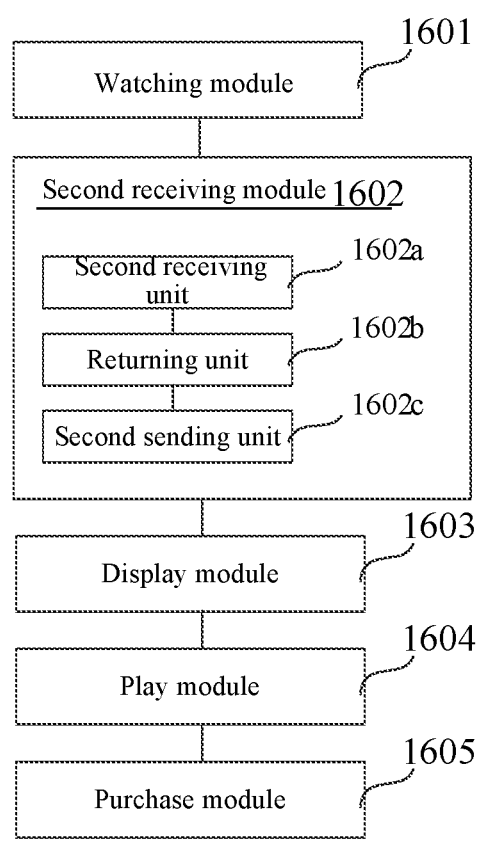
FIG. 16 is a block diagram showing an interactive device for an e-commerce application program according to another exemplary embodiment of the present disclosure.

FIG. 16 is a block diagram showing an interactive device for an e-commerce application program according to another exemplary embodiment of the present disclosure. The interactive device for an e-commerce application program can be implemented as a part or whole of a user terminal by software, hardware or a combination thereof. The interactive device for an e-commerce application program may include a watching module 1601, and a second receiving module 1602.

The watching module 1601 is configured to watch a product category in an e-commerce application program, wherein the product category corresponds to an interactive channel in the e-commerce application program, and the interactive channel is a collection of groups configured to realize instant communications between a seller account and at least one user account.

The second receiving module 1602 is configured to receive an interactive virtual item sent from the seller account in the interactive channel.

According to an embodiment, the interactive virtual item includes a first virtual item which corresponds to a prize-obtaining character string.

The second receiving module 1602 includes a second receiving unit 1602a, and a returning unit 1602b.

The second receiving unit 1602a is configured to receive a prize-obtaining message sent from the seller account in the interactive channel, wherein the prize-obtaining message carries the prize-obtaining character string.

The returning unit 1602b is configured to return back a text message in the interactive channel, wherein a content of the text message includes the prize-obtaining character string.

The second receiving unit 1602a is configured to receive the first virtual item sent from the seller account.

According to an embodiment, the interactive virtual item includes a second virtual item which is sent randomly.

The second receiving module 1602 includes a second receiving unit 1602a.

The second receiving unit 1602a is configured to receive the second virtual item sent from the seller account, wherein the second virtual item is randomly sent to at least one user account in the interactive channel.

According to an embodiment, the interactive virtual item includes third virtual items, and the number of the third virtual items is predetermined.

The second receiving module 1602 includes a second receiving unit 1602a, and a second sending unit 1602c.

The second receiving unit 1602a is configured to receive a virtual item package sent from the seller account in the interactive channel, wherein the virtual item package is configured for obtaining the third virtual items.

The second sending unit 1602c is configured to send a request for obtaining the virtual item package.

The second receiving unit 1602a is configured to receive the third virtual items sent from the seller account.

According to an embodiment, the device further includes a second receiving module 1602, and a display module 1603.

The second receiving module 1602 is configured to receive chat messages sent from a first user account in a group channel of the e-commerce application program, wherein the group channel is a chat channel established by the seller account or the at least one user account in the e-commerce application program.

The display module 1603 is configured to display the chat messages.

According to an embodiment, the device further includes a second receiving module 1602 and a play module 1604.

The second receiving module 1602 is configured to receive a live video stream sent from an anchor user account in a live channel of the e-commerce application program, wherein the live video stream is configured for delivering live video contents relating to a predetermined product.

The play module 1604 is configured to play the live video stream in the live channel.

According to an embodiment, the device further includes a purchase module 1605.

The purchase module 1605 is configured to purchase a product in the e-commerce application program through a preset purchase link, wherein the preset purchase link is a purchase link provided by the live channel.

Alternatively, the purchase module 1605 is configured to purchase a product in the e-commerce application program using a preset coupon, wherein the preset coupon is provided by the live channel.

Alternatively, the purchase module 1605 is configured to purchase a product in the e-commerce application program using a preset purchase qualification code, wherein the preset purchase qualification code is provided by the live channel.

Alternatively, the purchase module 1605 is configured to provide a raffling resource to a server, wherein the raffling resource is configured for participating a raffling purchase for a preset product in the live channel, wherein the raffling purchase refers to a purchase manner of randomly determining an audience user account which finally purchases successfully from audience user accounts providing raffling resources to a server.

In view of the above, in the present embodiment, a user terminal watches a product category, a seller account sends an interactive virtual item to the user account via an interactive channel, and the user terminal receives the interactive virtual item sent from the seller account in the interactive channel. This realizes a real time two-way interactive between seller accounts and user account, thereby enhancing the social attributes of e-commerce application programs. In this way, user accounts are actively involved in the interaction procedure, and thus the communication types between users and sellers are enriched.

Further, a seller account sends a first virtual item to at least one user account via an interactive channel, and a user account inputs a corresponding prize-obtaining string to obtain the first virtual item. Or, second virtual items are sent from a seller account to at least one user account via an interactive channel, and a server randomly sends the second virtual items to target user accounts. Or, third virtual items are sent to at least one user account from a seller account via an interactive channel, a request for obtaining the third virtual items may be sent manually using a user account, and then the third virtual items can be obtained at different times, that is to say, those user accounts which send the request earlier can obtain the third virtual items. This realizes real time two-way interactions between the seller account and the at least one user account, thereby enhancing the social attributes of e-commerce application programs. In this way, user accounts are actively involved in the interaction procedure, and thus the communication types between users and sellers are enriched.

In addition, by providing a group channel in an e-commerce application program, individual user accounts in the e-commerce application accounts can communicate with each other in real time. Thus, as compared with conventional comment systems in e-commerce application programs, the present embodiment increases the social attribute of the e-commerce application program, and enriches the communication types between user accounts in the e-commerce application program.

Also, by adding a live channel in an e-commerce application program, real time two-way interactions between an anchor user account and at least one audience user account by means of live video stream can be realized, thereby enhancing the live social attributes of e-commerce application program. In this way, audience user accounts are actively involved in the interaction procedure with the anchor user account, and thus the communication types between user accounts in the e-commerce application programs are enriched. Products are purchased by the audience user terminals via the live channel, products become more intuitive for users, and it is convenient for users to have an idea of properties of products. Thus, users' purchase for products is boosted, and purchase patterns of products are enriched. In addition, by providing the commission resource to the anchor user account, the interaction for the anchor to promote products is enhanced, which is benefit for selling and marketing of the products in the e-commerce application program.

Figure 17:
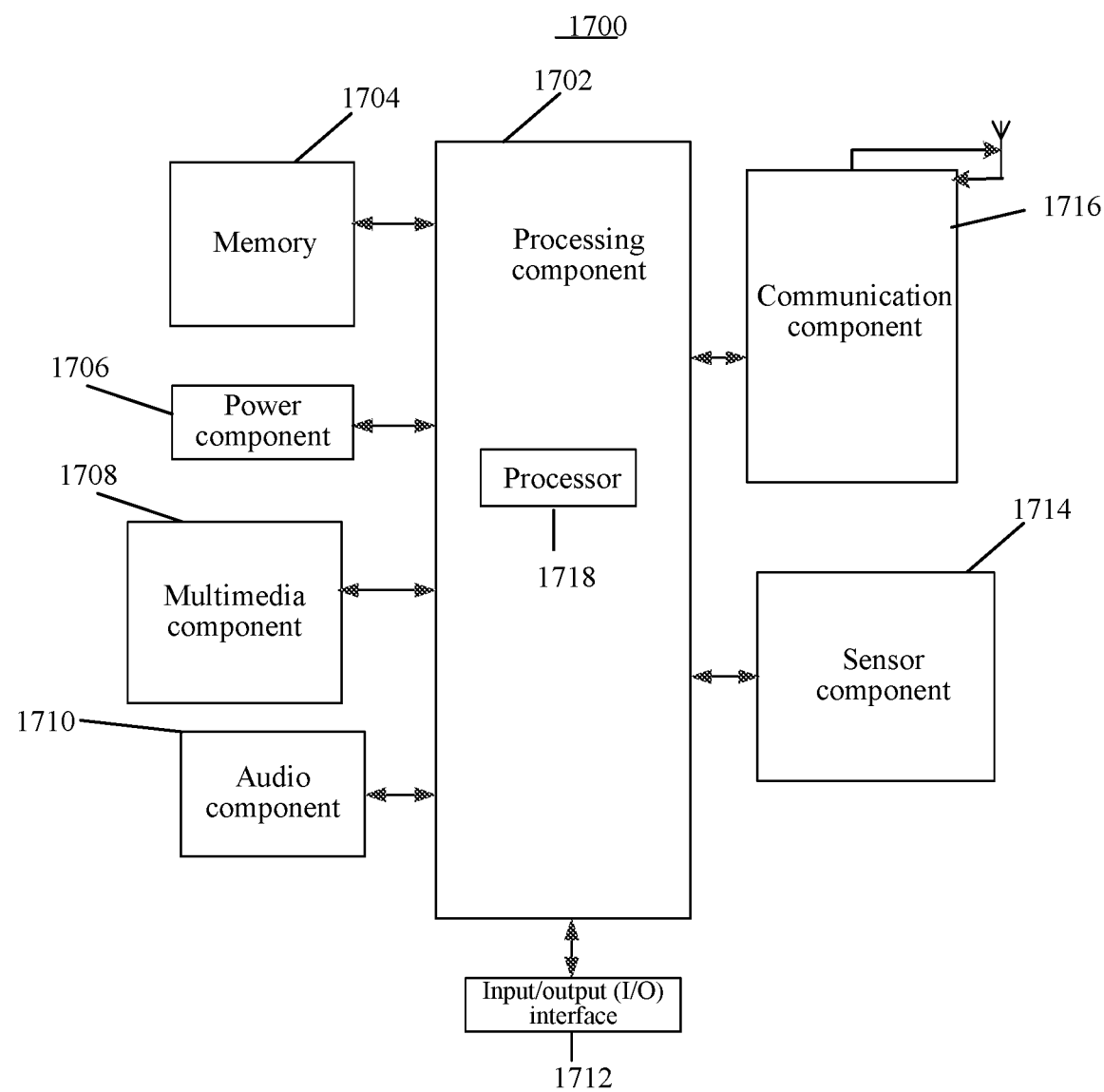
FIG. 17 is a block diagram showing a user terminal according to another exemplary embodiment of the present disclosure.

FIG. 17 is a block diagram showing a user terminal 1700 according to an exemplary embodiment. For example, the user terminal 1700 may be a mobile phone, a computer, a digital broadcast terminal, a messaging device, a gaming console, a tablet, a medical device, exercise equipment, a personal digital assistant, and the like.

Referring to FIG. 17, the user terminal 1700 may include one or more of the following components: a processing component 1702, a memory 1704, a power component 1706, a multimedia component 1708, an audio component 1710, an input/output (I/O) interface 1712, a sensor component 1714, and a communication component 1716.

The processing component 1702 typically controls overall operations of the user terminal 1700, such as the operations associated with display, telephone calls, data communications, camera operations, and recording operations. The processing component 1702 may include one or more processors 1718 to execute instructions to perform all or part of the steps in the above described methods. Moreover, the processing component 1702 may include one or more modules which facilitate the interaction between the processing component 1702 and other components. For instance, the processing component 1702 may include a multimedia module to facilitate the interaction between the multimedia component 1708 and the processing component 1702.

The memory 1704 is configured to store various types of data to support the operation of the user terminal 1700. Examples of such data include instructions for any applications or methods operated on the user terminal 1700, contact data, phonebook data, messages, pictures, video, etc. The memory 1704 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 1706 provides power to various components of the user terminal 1700. The power component 1706 may include a power management system, one or more power sources, and any other components associated with the generation, management, and distribution of power in the user terminal 1700.

The multimedia component 1708 includes a screen providing an output interface between the user terminal 1700 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 1708 includes a front camera and/or a rear camera. The front camera and the rear camera may receive an external multimedia datum while the user terminal 1700 is in an operation mode, such as a photographing mode or a video mode. Each of the front camera and the rear camera may be a fixed optical lens system or have focus and optical zoom capability.

The audio component 1710 is configured to output and/or input audio signals. For example, the audio component 1710 includes a microphone ("MIC") configured to receive an external audio signal when the user terminal 1700 is in an operation mode, such as a call mode, a recording mode, and a voice recognition mode. The received audio signal may be further stored in the memory 1704 or transmitted via the communication component 1716. In some embodiments, the audio component 1710 further includes a speaker to output audio signals.

The I/O interface 1712 provides an interface between the processing component 1702 and peripheral interface modules, such as a keyboard, a click wheel, buttons, and the like. The buttons may include, but are not limited to, a home button, a volume button, a starting button, and a locking button.

The sensor component 1714 includes one or more sensors to provide status assessments of various aspects of the user terminal 1700. For instance, the sensor component 1714 may detect an open/closed status of the user terminal 1700, relative positioning of components, e.g., the display and the keypad, of the user terminal 1700, a change in position of the user terminal 1700 or a component of the user terminal 1700, a presence or absence of user contact with the user terminal 1700, an orientation or an acceleration/deceleration of the user terminal 1700, and a change in temperature of the user terminal 1700. The sensor component 1714 may include a proximity sensor configured to detect the presence of nearby objects without any physical contact. The sensor component 1714 may also include a light sensor, such as a CMOS or CCD image sensor, for use in imaging applications. In some embodiments, the sensor component 1714 may also include an accelerometer sensor, a gyroscope sensor, a magnetic sensor, a pressure sensor, or a temperature sensor.

The communication component 1716 is configured to facilitate communication, wired or wirelessly, between the user terminal 1700 and other devices. The user terminal 1700 can access a wireless network based on a communication standard, such as WiFi, 2G or 3G or a combination thereof. In one exemplary embodiment, the communication component 1716 receives a broadcast signal or broadcast associated information from an external broadcast management system via a broadcast channel. In one exemplary embodiment, the communication component 1716 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the user terminal 1700 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In exemplary embodiments, there is also provided a non-transitory computer-readable storage medium including instructions, such as included in the memory 1704, executable by the processor 1718 in the user terminal 1700, for performing the above-described interactive methods for an e-commerce application program. For example, the non-transitory computer-readable storage medium may be a ROM, a RAM, a CD-ROM, a magnetic tape, a floppy disc, an optical data storage device, and the like.

Figure 18:
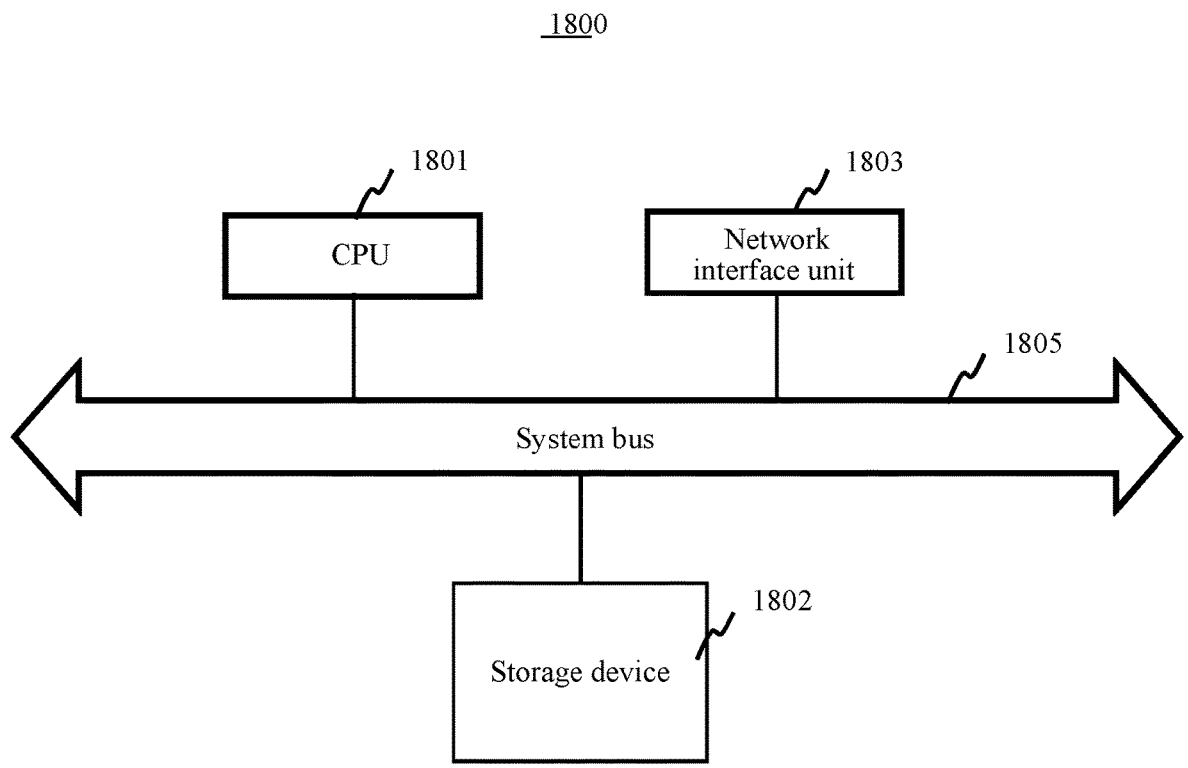
FIG. 18 is a block diagram showing a server according to another exemplary embodiment of the present disclosure.

FIG. 18 is a block diagram of a server according to an exemplary embodiment of the present disclsoure. The server is a background server of the e-commerce application program in the implementation environment as shown in FIG. 1. The background server of the e-commerce application program is configured to implement the interactive methods for the e-commerce application program at the server side as shown in FIGS. 2, 3A, 4A, 5, 6, 7, 8, 9A, 10A, 11A and 12.

The server 1800 includes a Central Process Unit (CPU) 1801, a storage device 1802, a network interface unit 1803, and a system bus 1805 connecting the CPU 1801, the storage device 1802 and the network interface unit 1803.

The storage device 1802 is configured to store operating systems, application programs, and other program modules. The storage device 1802 is connected with the CPU 1801 by a storage controller (not shown) which is connected to the system bus 1805. The storage device 1802 and related computer readable medium provide non-transitory storage for the server 1800. That is to say, the storage device 1802 may include computer readable medium (not shown) like hard disk or CD-ROM driver.

Generally, the computer readable medium may include a computer storage medium and a communication medium. The computer storage medium includes a transitory or non-transitory medium, a mobile or not mobile medium which is configured to store information such as computer readable instructions, data structures, program modules or other data and can be realized using any methods or technologies. The computer storage medium may include RAM, ROM, EPROM, EEPROM, a flash or other solid storage devices, CD-ROM, DVD or other optical storage device, a cassette, a magnetic tape, a magnetic disk or other magnetic storage device. Rather, one of ordinary skill in this art should appreciate that the computer storage medium is not limited the above listed ones. According to various embodiments of the present disclosure, the server 1800 can be connected to a remote computer via a network such as Internet to conduct operations. That is, the server 1800 can be connected to a network by the network interface unit 1803 which is connected with the system bus 1805. In other words, the network interface unit 1803 can be used to connect other types of networks or remote computer systems (not shown).

The storage device 1802 includes one or more programs. The one or more programs are stored in the storage device 1802, and are executable by one or more processors. When the server 1800 is the background server of the e-commerce application program, the one or more programs include instructions for implementing any one of the interactive methods at the server side as shown in FIGS. 2, 3A, 4A, 5, 6, 7, 8, 9A, 10A, 11A and 12.

Figure 19:
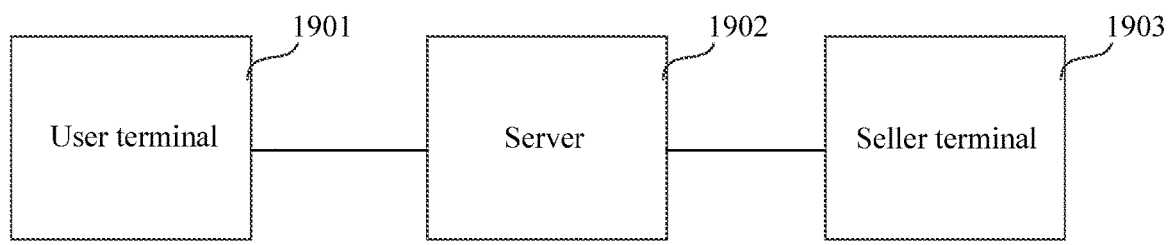
FIG. 19 is a block diagram showing an interactive system for an e-commerce application program according to another exemplary embodiment of the present disclosure.

FIG. 19 is an interactive system for an e-commerce application program according to an exemplary embodiment. The interactive system for an e-commerce application program may include a user terminal 1901, a server 1902 and a seller terminal 1903.

The user terminal 1901 is connected with the server 1902 via a wired or wireless network, and the server 1902 is connected with the seller terminal 1903 via a wired or wireless network.

The server 1902 may include the interactive device for an e-commerce application program as shown in FIG. 13 or 14, and is configured to implement any one of the interactive methods at the server side as shown in FIGS. 2, 3A, 4A, 5, 6, 7, 8, 9A, 10A, 11A and 12.

The user terminal 1901 may include the interactive device for an e-commerce application program as shown in FIG. 15 or 16, and is configured to implement any one of the interactive methods at the user terminal side as shown in FIGS. 2, 3A, 4A, 5, 6, 7, 8, 9A, 10A, 11A and 12.

One of ordinary skill in this art should appreciate that whole or a part of steps in the above embodiments can be implemented by hardware or programs which can instruct the related hardware to implement the above embodiments, and the programs can be stored in a computer readable storage medium which can be a read only memory, a magnetic disk or an optical disk and the like.

Some exemplary embodiments of the present disclosure are described above, but the present disclosure is not limited to those embodiments. Any changes, equivalent replacement, or modifications within the spirit and principle of the present disclosure should be encompassed in the scope of the present disclosure.

What is claimed is:

1. An interactive method for an e-commerce application program, the method comprising:
    receiving an interactive virtual item sent from a seller account in an interactive channel of the e-commerce application program, wherein the interactive channel is a collection of groups configured to realize instant communications between the seller account and at least one user account, and the interactive channel corresponds to a product category in the e-commerce application program;
    determining the at least one user account in the interactive channel;
    selecting at least one target user account from the at least one user account in the interactive channel based on speaking frequency or level of user accounts in the interactive channel;
    sending the interactive virtual item to the selected at least one target user account;
    receiving a live video stream sent from an anchor user account in a live channel of the e-commerce application program, wherein the live video stream is configured for delivering live video contents relating to a predetermined product;
    sending the live video stream to an audience user account in the live channel;
    calculating an exchange resource number of products purchased via the live channel;
    determining a commission resource of the anchor user account according to the exchange resource number; and
    transferring the commission resource from a first resource account corresponding to the seller account to a second resource account corresponding to the anchor user account.

2. The method according to claim 1, further comprising:
receiving chat messages sent from a first user account in a group channel of the e-commerce application program, wherein the group channel is a chat channel established by the seller account or the at least one user account in the e-commerce application program;
determining a second user account in the group channel; and
sending the chat messages to the second user account in the group channel.

3. The method according to claim 1, further comprising:
determining whether attribute data generated by the anchor user account in the live channel reaches a predetermined threshold, wherein the attribute data comprises the number of people who follow the live channel, and the number of simultaneous online people; and
increasing an account level of the anchor user account and sending an interactive item to the anchor user account if the attribute data reaches the predetermined threshold.

4. An interactive device for an e-commerce application program, the device comprising:
a processor; and
a memory for storing instructions executable by the processor;
wherein the processor is configured to:
receive an interactive virtual item sent from a seller account in an interactive channel of the e-commerce application program, wherein the interactive channel is a collection of groups configured to realize instant communications between the seller account and at least one user account, and the interactive channel corresponds to a product category in the e-commerce application program;
determine the at least one user account in the interactive channel;
select at least one target user account from the at least one user account in the interactive channel based on speaking frequency or level of user accounts in the interactive channel;
send the interactive virtual item to the selected at least one target user account;
receive a live video stream sent from an anchor user account in a live channel of the e-commerce application program, wherein the live video stream is configured for delivering live video contents relating to a predetermined product;
send the live video stream to an audience user account in the live channel;
calculate an exchange resource number of products purchased via the live channel;
determine a commission resource of the anchor user account according to the exchange resource number; and
transfer the commission resource from a first resource account corresponding to the seller account to a second resource account corresponding to the anchor user account.

5. The device according to claim 4, wherein the processor is further configured to:
receive chat messages sent from a first user account in a group channel of the e-commerce application program, wherein the group channel is a chat channel established by the seller account or the at least one user account in the e-commerce application program;
determine a second user account in the group channel; and
send the chat messages to the second user account in the group channel.

6. The device according to claim 4, wherein the processor is further configured to:
determine whether attribute data generated by the anchor user account in the live channel reaches a predetermined threshold, wherein the attribute data comprises the number of people who follow the live channel and the number of simultaneous online people; and
increase an account level of the anchor user account and sending an interactive item to the anchor user account if the attribute data reaches the predetermined threshold.

7. An interactive method for an e-commerce application program, the method comprising:
receiving a predetermined number of interactive virtual items sent from a seller account in an interactive channel of the e-commerce application program, wherein the interactive channel is a collection of groups configured to realize instant communications between the seller account and at least one user account, and the interactive channel corresponds to a product category in the e-commerce application program;
determining the at least one user account in the interactive channel;
generating a virtual item package based on the predetermined number of the interactive virtual items sent from the seller account, wherein the virtual item package is configured for obtaining the interactive virtual items;
sending the virtual item package to the at least one user account in the interactive channel;
receiving, from a user account, a request for obtaining the virtual item package;
determining whether there exists an interactive virtual item which has not been obtained yet in the virtual item package; and
sending an interactive virtual item to the user account sending the request in response to determining that there exists an interactive virtual item which has not been obtained yet in the virtual item package.

8. An interactive device for an e-commerce application program, the device comprising:
a processor; and
a memory for storing instructions executable by the processor;
wherein the processor is configured to:
receive a predetermined number of interactive virtual items sent from a seller account in an interactive channel of the e-commerce application program, wherein the interactive channel is a collection of groups configured to realize instant communications between the seller account and at least one user account, and the interactive channel corresponds to a product category in the e-commerce application program;
determine the at least one user account in the interactive channel;
generate a virtual item package based on the predetermined number of the interactive virtual items sent from the seller account, wherein the virtual item package is configured for obtaining the interactive virtual items;
send the virtual item package to the at least one user account in the interactive channel;
receive, from a user account, a request for obtaining the virtual item package;
determine whether there exists an interactive virtual item which has not been obtained yet in the virtual item package; and send an interactive virtual item to the user account sending the request in response to determining that there exists an interactive virtual item which has not been obtained yet in the virtual item package.

* * * * *